(12) United States Patent
Hatanaka et al.

(10) Patent No.: US 7,256,799 B2
(45) Date of Patent: Aug. 14, 2007

(54) IMAGE SYNTHESIZER, IMAGE SYNTHESIS METHOD AND COMPUTER READABLE RECORDING MEDIUM HAVING IMAGE SYNTHESIS PROCESSING PROGRAM RECORDED THEREON

(75) Inventors: Haruo Hatanaka, Kyoto (JP); Takashi Iida, Osaka (JP); Naoki Chiba, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/237,709

(22) Filed: Sep. 10, 2002

(65) Prior Publication Data
US 2003/0076361 A1    Apr. 24, 2003

(30) Foreign Application Priority Data
Sep. 12, 2001   (JP)   ............................. 2001-276605
Oct. 17, 2001   (JP)   ............................. 2001-319805

(51) Int. Cl.
*G09G 5/00*   (2006.01)
(52) U.S. Cl. ................... 345/629; 345/1.3; 345/634; 345/635; 382/154; 382/284; 382/289; 382/294; 715/838
(58) Field of Classification Search ............... 382/154, 382/284, 289; 345/629, 641, 635; 348/584; 715/838
See application file for complete search history.

(56) References Cited

U.S. PATENT DOCUMENTS

| | | | |
|---|---|---|---|
| 6,157,747 A * | 12/2000 | Szeliski et al. ............. 382/284 |
| 6,434,265 B1 * | 8/2002 | Xiong et al. ................ 382/154 |
| 6,473,536 B1 * | 10/2002 | Chiba et al. ................ 382/284 |
| 6,535,650 B1 * | 3/2003 | Poulo et al. ................ 382/284 |
| 6,549,681 B1 * | 4/2003 | Takiguchi et al. .......... 382/294 |
| 6,593,938 B1 * | 7/2003 | Sakata et al. ............... 345/629 |
| 6,663,685 B2 * | 12/2003 | Wright et al. ................. 55/507 |
| 6,720,971 B1 * | 4/2004 | Yamamoto et al. ......... 345/581 |
| 6,964,025 B2 * | 11/2005 | Angiulo et al. ............. 715/838 |
| 2001/0015729 A1 * | 8/2001 | Eguchi ...................... 345/630 |

FOREIGN PATENT DOCUMENTS

| | | | |
|---|---|---|---|
| JP | 10-108003 | | 4/1998 |
| JP | 11-213141 | * | 8/1999 |
| JP | 2000-147944 A | | 5/2000 |

* cited by examiner

*Primary Examiner*—Kee M. Tung
*Assistant Examiner*—Antonio Caschera
(74) *Attorney, Agent, or Firm*—McDermott Will & Emery LLP

(57) ABSTRACT

In an image stitcher for arranging a plurality of images to be stitched in m rows and n columns (both m and n are natural numbers) on a monitor screen such that their respective arrangement positions conform to an actual relative positional relationship, to stitch all the images utilizing information related to the arrangement position of each of the images, the image stitcher comprises means for displaying on the monitor screen an image arrangement pattern selection screen including a plurality of types of image arrangement patterns for arranging the plurality of images to be stitched in m rows and n columns on the monitor screen, means for causing a user to select one of the plurality of types of image arrangement patterns on the image arrangement pattern selection screen, and means for arranging the plurality of images to be stitched in m rows and n columns on the monitor screen in accordance with the image arrangement pattern selected by the user.

7 Claims, 28 Drawing Sheets

FIG. 12

| A1 | A2 | A3 |
|----|----|----|
| A6 | A5 | A4 |
| A7 | A8 | A9 |

(a) PATTERN A

| A1 | A6 | A7 |
|----|----|----|
| A2 | A5 | A8 |
| A3 | A4 | A9 |

(b) PATTERN B

| A3 | A2 | A1 |
|----|----|----|
| A4 | A5 | A6 |
| A9 | A8 | A7 |

(c) PATTERN C

| A1 | A2 | A3 |
|----|----|----|
| A4 | A5 | A6 |
| A7 | A8 | A9 |

(d) PATTERN D

| A1 | A4 | A7 |
|----|----|----|
| A2 | A5 | A8 |
| A3 | A6 | A9 |

(e) PATTERN E (a)

(b)

(c)

(d)

(e)

(f)

(g)

(h)

(i)

(a)　(b)　(c)　(d)

IMAGE SYNTHESIZER, IMAGE SYNTHESIS METHOD AND COMPUTER READABLE RECORDING MEDIUM HAVING IMAGE SYNTHESIS PROCESSING PROGRAM RECORDED THEREON

BACKGROUND OF THE INVENTION

1. Field of the Invention

The present invention relates to an image stitcher, an image stitching method, a computer readable recording medium having an image stitch processing program recorded thereon, for automatically joining from a plurality of microscopic images, for example, the images and acquiring a composite image having a high resolution and having a wide field of view.

2. Description of the Prior Art

[1] Description of Conventional Optical Flow Calculation Method

A technique for calculating an optical flow from two images, and registering the two images on the basis of the obtained optical flow has been known. Description is made of a conventional method of calculating an optical flow.

(1) Lucas-Kanade Method

A large number of methods of calculating an apparent optical flow of a moving object in a moving image have been conventionally proposed. The Lucas-Kanade method which is a local gradient method out of the methods is one of the best methods. The reason for this is that the speed of processing is high, implementing is easy, and the result has confidence.

As for the details of the Lucas-Kanade method, see an article: B. Lucas and T. Kanade, "An Iterative Image Registration Technique with an Application to Stereo Vision," In Seventh International Joint Conference on Artificial Intelligence (IJCAI-81), pp.674-979, 1981.

The outline of the Lucas-Kanade method will be described.

When a gray scale pattern I=(x, y, t) of image coordinates p=(x, y) at time t is moved to coordinates (x+δx, y+δy) with its gradation distribution kept constant after a very short time period (δt), the following optical flow constraint equation (1) holds:

$$\frac{\partial I}{\partial x}\frac{\delta x}{\delta t} + \frac{\partial I}{\partial y}\frac{\delta y}{\delta t} + \frac{\partial I}{\partial t} = 0 \quad (1)$$

In order to calculate an optical flow {v=(δx/δt, δy/δt)=(u, v)} in a two-dimensional image, another constraint equation is required because the number of unknown parameters is two. Lucas and Kanade have assumed that the optical flow is constant in a local region of an object.

Suppose the optical flow is constant within a local region ω on an image, for example. In this case, a square error E of a gray scale pattern which is desired to be minimized can be defined by the following equation (2) when the following substitutions, are made:

$I_0(P)=I(x,y,t)$, $I_1(p+v)=I(x+u,y+v,t+\delta t)$ $$E = \sum_\omega ([I_1(p + v) - I_0(p)])^2 \quad (2)$$

When v is very small, the terms of second and higher degrees in Taylor's dilation can be ignored. Accordingly, at a relationship expressed by the following equation (3) holds:

$I_1(p+v)=I_1(p)+g(p)v$ (3)

where g (p) is a linear differential of $I_1$ (p).

The error E is minimized when the derivative of E with respect to v is zero. Accordingly, a relationship expressed by the following equation (4) holds:

$$0 = \frac{\partial}{\partial v}E \quad (4)$$

$$\approx \frac{\partial}{\partial v}\sum_\omega ([I_1(p) + g(p)v - I_0(p)])^2$$

$$= \sum_\omega 2g(p)[I_1(p) + g(p)v - I_0(p)]$$

Therefore, the optical flow v is found by the following equation (5):

$$v \approx \frac{\sum_\omega g(p)[I_0(p) - I_1(p)]}{\sum_\omega g(p)^2} \quad (5)$$

Furthermore, the optical flow can be found with high precision by Newton-Raphson iteration, as expressed by the following equation (6):

$$v_{k+1} = v_k + \frac{\sum g_k[I_0 - I_1^k]}{\sum (g_k)^2} \quad (6)$$

$I_1^k=I_1(p+v_k)$, $g_k=g(p+v_k)$, $I_0=I_0(p)$ (2) Hierarchical Estimation Method The largest problem of the gradient methods, including the Lucas-Kanade method, is that they cannot be applied to a large motion because a good initial value is required. Therefore, a method of producing images respectively having resolutions which differ at several levels like a pyramid hierarchical structure to solve the problem has been conventionally proposed.

Images having resolutions which differ at several levels are first previously produced from each of two consecutive images. An approximate optical flow is then calculated between the images having the lowest resolution. A more precise optical flow is calculated between the images having resolutions which are higher by one level. The processing is successively repeated until the optical flow is calculated between the images having the highest resolution.

FIG. 4, FIG. 3, FIG. 2, and FIG. 1 respectively illustrate an original image, an image having a lower resolution than that of the original image shown in FIG. 4, an image having a lower resolution than that of the image having a low resolution shown in FIG. 3, and an image having a lower resolution than that of the image having a low resolution shown in FIG. 2. In FIGS. 1 to 4, S indicates one patch.

An optical flow is gradually found from the image shown in FIG. 1 (an image in a hierarchy 1), the image shown in FIG. 2 (an image in a hierarchy 2), the image shown in FIG. 3 (an image in a hierarchy 3), and the image shown in FIG. 4 (an image in a hierarchy 4) in this order. In FIGS. 1 to 4, an arrow indicates an optical flow vector found for each patch.

However, the problem is that in a real image, there are few regions containing sufficient texture, so that a reliable optical flow is not obtained.

[2] Description of Optical Flow Calculation Method Developed by Applicant

An optical flow calculation method developed by the applicant of the present invention presupposes hierarchical estimation for producing images having resolutions which differ at several levels like a pyramid hierarchical structure to gradually calculate an optical flow. A method of calculating an optical flow conforms to a gradient method such as the Lucas-Kanade method. That is, it presupposes an optical flow estimation method using a hierarchically structured gradient method. The Lucas-Kanade method is used as the gradient method.

The optical flow estimation method developed by the applicant of the present invention is characterized in that an optical flow obtained in each of stages of the optical flow estimation method using the hierarchically structured Lucas-Kanade method is filled by dilation processing. This will be described in detail below.

One of advantages of the Lucas-Kanade method is that the result of tracking has confidence. Tomasi and Kanade have showed that the trackability of a region can be calculated from image derivatives as follows (C. Tomasi and Kanade, "Shape and Motion from Image Streams: a Factorization method-Part 3 Detection and Tracking of Point Features," CMU-CS-91-132, Carnegie Mellon University, 1991).

From a 2×2 matrix of coefficients G in the following equation (7) having as elements the squares of differentials in the vertical and horizontal directions of an image ω in a region, its eigenvalues are calculated, thereby making it possible to determine the trackability of the region:

$$G = \sum_{p \in \omega} g(p)g(p)^T \quad (7)$$

When both the eigenvalues of the matrix G are large, the region changes in orthogonal directions, and can be uniquely positioned. Consequently, the confidence γ of the result of tracking can be obtained by the following equation (8) from the smaller eigenvalue $\lambda_{min}$ and a gray scale residual E between the regions after the tracking:

$$\gamma = \frac{\lambda_{min}}{E} \quad (8)$$

The inventors and others of the present invention have developed a method of interpolating a region having low confidence using the result having high confidence in the same hierarchy in an optical flow. This uses the result in a hierarchy at the next coarser resolution level for only an initial value for tracking and does not utilize the result in a hierarchy at the current resolution level which is paid attention to. Alternatively, it is assumed that an optical flow in a region which is hardly textured has a value close to optical flows in its surrounding regions, to fill a flow field by morphology processing.

FIG. 5 shows how flow vector dilation processing is performed.

The left drawing represents a map of the confidence of a flow vector on a gray scale. It is assumed that the blacker the map is, the higher the confidence is.

Obtained flow is first subjected to threshold processing. A white portion is subjected to threshold processing because the result has low confidence.

The dilation processing of the result in the flow field is then performed as follows in imitation of hole filling processing using a morphology operation in a binary image. A flow vector u(i, j) in coordinates i,j of a region can be calculated, as expressed by the following equation (9), upon being weighted depending on confidence γ from flow vectors at its four vicinities:

$$u(i, j) = \sum_{p,q} \frac{\gamma(i+p, j+q) \times u(i+p, j+q)}{\gamma_A} \quad (9)$$

$$(p, q) = (0, 1), (0, -1), (-1, 0), (1, 0)$$

$$\gamma_A = \sum_{p,q} \gamma(i+p, j+q)$$

The processing is repeated until all regions having low confidence which have been subjected to threshold processing are filled. The filling processing is performed in each hierarchy. The flow vector u(i, j) in the coordinates i,j of the region may be calculated upon being weighted depending on confidence γ from flow vectors at its eight vicinities.

FIG. 6a illustrates an optical flow which has been subjected to threshold processing for an image in a hierarchy, and FIG. 6b illustrates an optical flow after filling. In FIG. 6a, arrows are optical flow vectors whose confidence is judged to be high by the threshold processing, and X marks indicate portions whose confidence is judged to be low.

[3] Description of Stitching Technique of Images

The applicant of the present invention has developed a technique (image stitching software) for calculating a geometric transform factor between images and stitching a plurality of images picked up on the basis of the calculated geometric transform factor.

In the image stitching software developed by the applicant of the present invention, when a plurality of images picked up in a two-dimensional arrangement are connected to one another to produce one composite image, the plurality of images picked up are arranged in a two-dimensional manner on a monitor screen such that the respective arrangement positions conform to an actual relative positional relationship. A pair of adjacent images from which an overlapped portion should be extracted is determined utilizing information related to the arrangement positions (the relative positional relationship between the images), to extract for the adjacent images the overlapped portion of the images. Utilizing the overlapped portion of the images extracted for the adjacent images, a correspondence between feature points is established for the adjacent pixels. The feature points between which a correspondence is established for the adjacent images are utilized, to calculate a geometric transform factor for the adjacent images and stitch all the images utilizing the geometric transform factor calculated for the adjacent images.

In the present conditions, when the plurality of images picked up are arranged in a two-dimensional manner on a monitor screen such that their respective arrangement positions conform to the actual relative positional relationship, a user sets the arrangement position for each of the images. Therefore, an operation for arranging the plurality of images picked up in a two-dimensional manner on the monitor screen is troublesome. Further, the user sets the arrangement positions of the images picked up one at a time, so that errors in the arrangement of the images are liable to occur.

SUMMARY OF THE INVENTION

An object of the present invention is to provide an image stitcher, an image stitching method, and a computer readable recording medium having an image stitch processing program recorded thereon, in which an operation in arranging a plurality of images picked up in a two-dimensional manner on a monitor screen is simplified so as to correspond to an actual positional relationship and errors in the arrangement of the images do not easily occur.

Another object of the present invention is to provide an image stitching method in which even in a case where images picked up are arranged in the shape of two-dimensional lattices on a monitor screen so that no images exist in parts of the two-dimensional lattices, all the images arranged in a two-dimensional manner can be automatically transformed into a one-dimensional arrangement such that the adjacent images are overlapped with each other.

In an image stitcher for arranging a plurality of images to be stitched in m rows and n columns (m and n are natural numbers) on a monitor screen such that their respective arrangement positions conform to an actual relative positional relationship, to stitch all the images utilizing information related to the arrangement position of each of the images, an image stitcher according to the present invention is characterized by comprising means for displaying on the monitor screen an image arrangement pattern selection screen including a plurality of types of image arrangement patterns for arranging the plurality of images to be stitched in m rows and n columns on the monitor screen; means for causing a user to select one of the plurality of types of image arrangement patterns on the image arrangement pattern selection screen; and means for arranging the plurality of images to be stitched in m rows and n columns on the monitor screen in accordance with the image arrangement pattern selected by the user.

It is preferable that the image stitcher comprises means for causing the user to select the plurality of images to be stitched and set the number of rows m and the number of columns n depending on the selected images. It is preferable that the image stitcher comprises means for taking the image arrangement pattern selected by the user this time as the initial value of a selection pattern at the time of selecting the subsequent image arrangement pattern.

In an image stitching method for arranging a plurality of images to be stitched in m rows and n columns (m and n are natural numbers) on a monitor screen such that their respective arrangement positions conform to an actual relative positional relationship, to stitch all the images utilizing information related to the arrangement position of each of the images, a first image stitching method according to the present invention is characterized by comprising the steps of displaying on the monitor screen an image arrangement pattern selection screen including a plurality of types of image arrangement patterns for arranging the plurality of images to be stitched in m rows and n columns on the monitor screen; causing a user to select one of the plurality of types of image arrangement patterns on the image arrangement pattern selection screen; and arranging the plurality of images to be stitched in m rows and n columns on the monitor screen in accordance with the image arrangement pattern selected by the user.

It is preferable that the image stitching method comprises the step of causing the user to select the plurality of images to be stitched and set the number of rows m and the number of columns n depending on the selected images. It is preferable that the image stitching method comprises the step of taking the image arrangement pattern selected by the user this time as the initial value of a selection pattern at the time of selecting the subsequent image arrangement pattern.

A recording medium according to the present invention is a computer readable recording medium having an image stitch processing program, for arranging a plurality of images to be stitched in m rows and n columns (m and n are natural numbers) on a monitor screen such that their respective arrangement positions conform to an actual relative positional relationship, to stitch all the images utilizing information related to the arrangement position of each of the images, recorded thereon, characterized in that the program causes a computer to carry out the steps of displaying on the monitor screen an image arrangement pattern selection screen including a plurality of types of image arrangement patterns for arranging the plurality of images to be stitched in m rows and n columns on the monitor screen; causing a user to select one of the plurality of types of image arrangement patterns on the image arrangement pattern selection screen; and arranging the plurality of images to be stitched in m rows and n columns on the monitor screen in accordance with the image arrangement pattern selected by the user.

It is preferable that the computer readable recording medium has the program, for causing the computer to carry out the step of causing the user to select the plurality of images to be stitched and set the number of rows m and the number of columns n depending on the selected images, recorded thereon. It is preferable that the computer readable recording medium has the program, for causing the computer to carry out the step of taking the image arrangement pattern selected by the user this time as the initial value of a selection pattern at the time of selecting the subsequent image arrangement pattern, recorded thereon.

A second image stitching method according to the present invention is characterized by comprising a first step of arranging a plurality of images in a two-dimensional manner such that their respective arrangement positions conform to an actual relative positional relationship; a second step of automatically arranging all the images arranged in a two-dimensional manner in such a one-dimensional manner that the adjacent images have an overlapped portion; and a third step of determining the adjacent images on the basis of the images arranged in a one-dimensional manner and stitching the adjacent images to obtain a composite image of all the images, the second step comprising the steps of registering for each of the images arranged in a two-dimensional manner information related to the adjacent images having an overlapped portion comprising information for specifying the adjacent images and information related to the distances between the center of the image and the centers of the adjacent images, searching for a route which satisfies conditions under which the adjacent images having an overlapped portion are connected to each other and along which all the images can be drawn with one stroke using the information related to the adjacent images which is registered For each of the images, and arranging, when the route which satisfies conditions under which the adjacent images are connected to each other and along which all the images can be drawn with one stroke can be searched for, all the images in a one-dimensional manner in accordance with the route searched for.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a schematic view showing the relationship between each of image arrangement patterns A to D and respective two-dimensional arrangement positions of images A1 to A9;

DESCRIPTION OF THE PREFERRED EMBODIMENTS

Description is now made of embodiments in a case where the present invention is applied to a microscopic image stitcher.

[A] FIRST EMBODIMENT

[1] Description of Overall Configuration of Microscopic Image Stitcher

Figure 1:
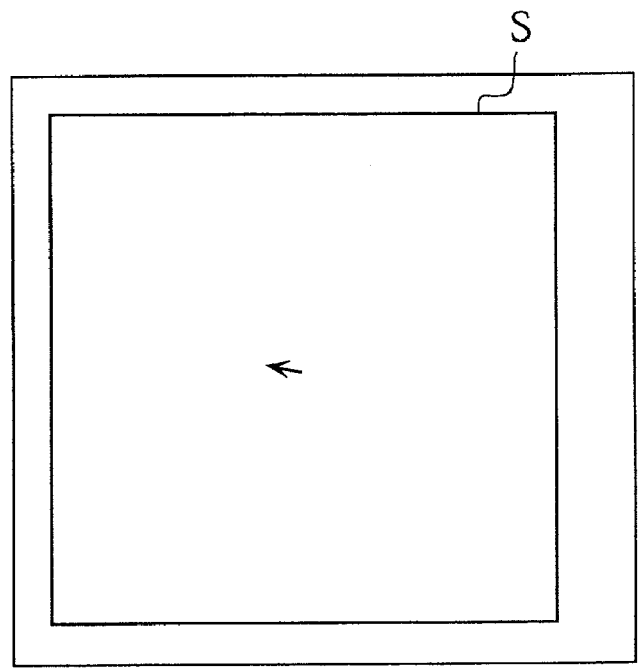
FIG. 1 is a schematic view for explaining a hierarchical estimation method, which illustrates an image in a hierarchy 1.
Figure 2:
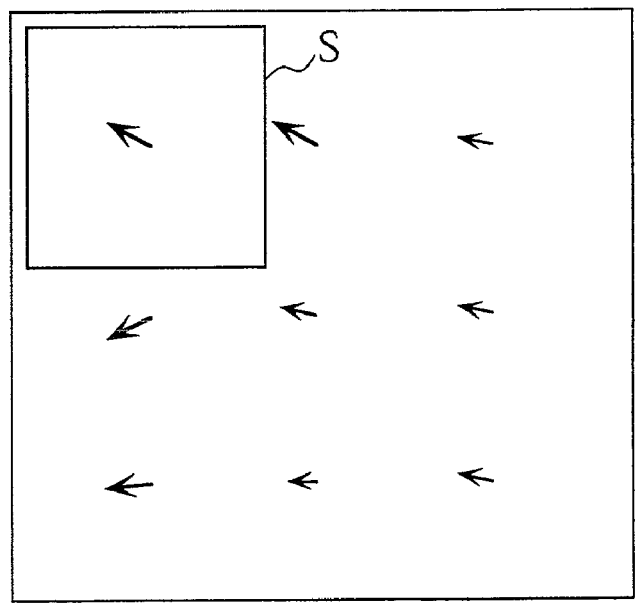
FIG. 2 is a schematic view for explaining a hierarchical estimation method, which illustrates an image in a hierarchy 2.
Figure 3:
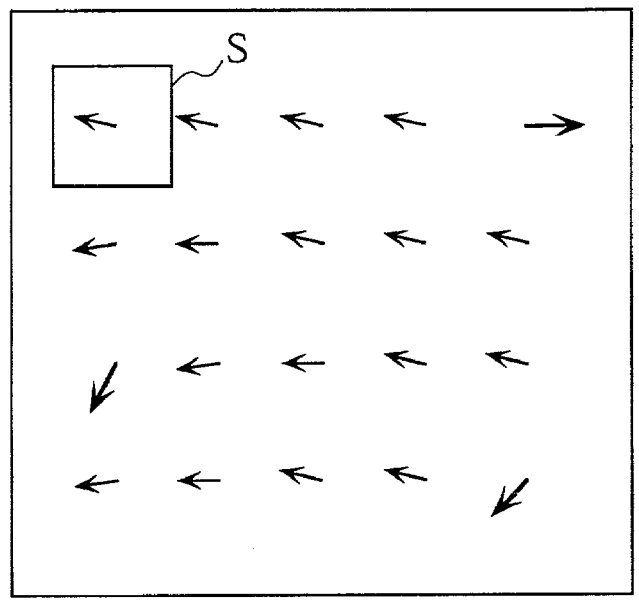
FIG. 3 is a schematic view for explaining a hierarchical estimation method, which illustrates an image in a hierarchy 3.
Figure 4:
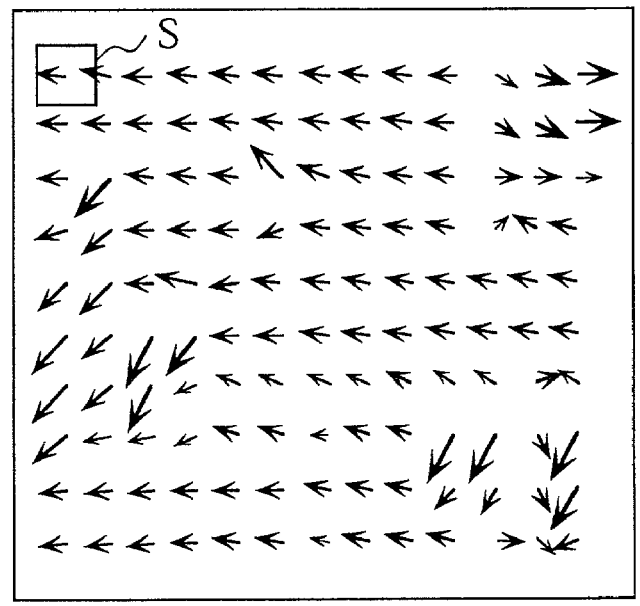
FIG. 4 is a schematic view for explaining a hierarchical estimation method, which illustrates an image in a hierarchy 4.
Figure 5:
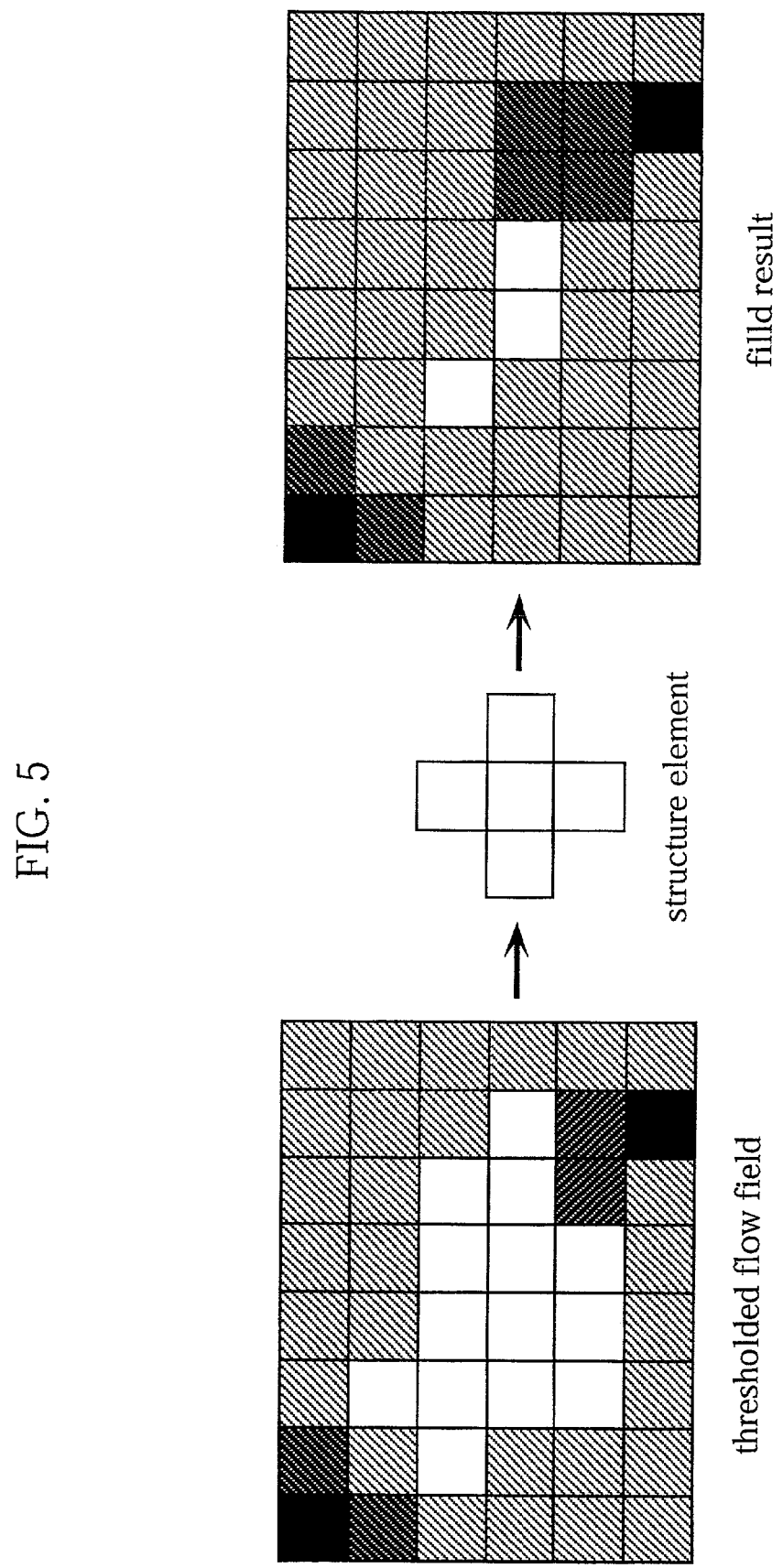
FIG. 5 is a schematic view for explaining dilation processing performed in an optical flow estimation method employed in the present embodiment.
Figure 6B:
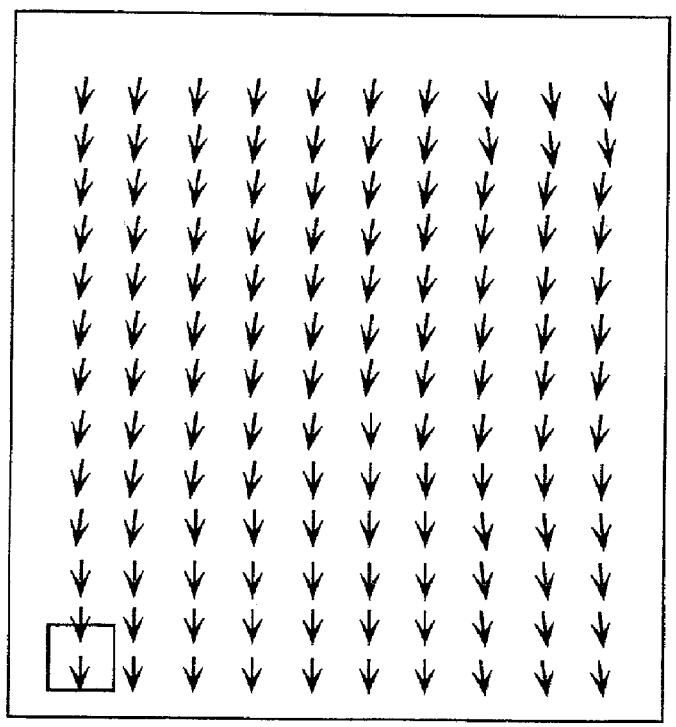
FIG. 6b is a schematic view showing an optical flow after filling.
Figure 6A:
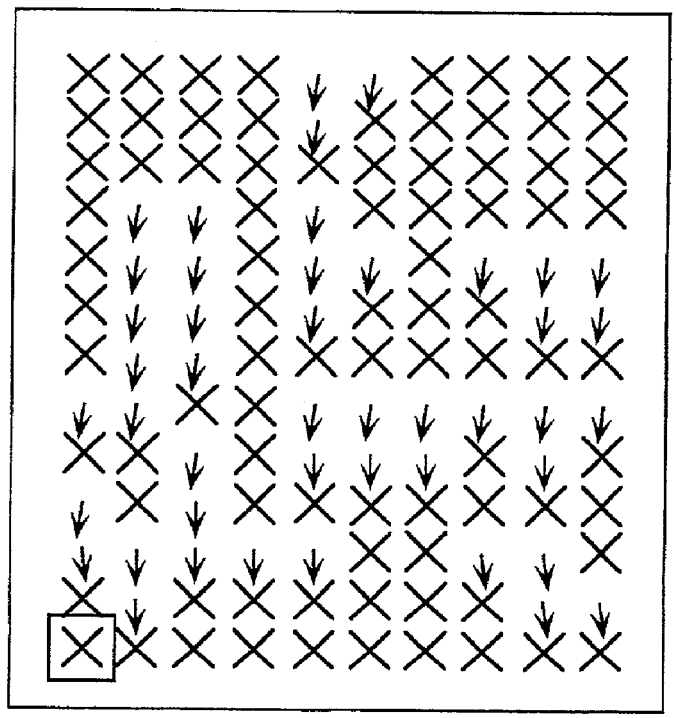
FIG. 6a is a schematic view showing an example of an optical flow which has been subjected to threshold processing for an image in a hierarchy.
Figure 7:
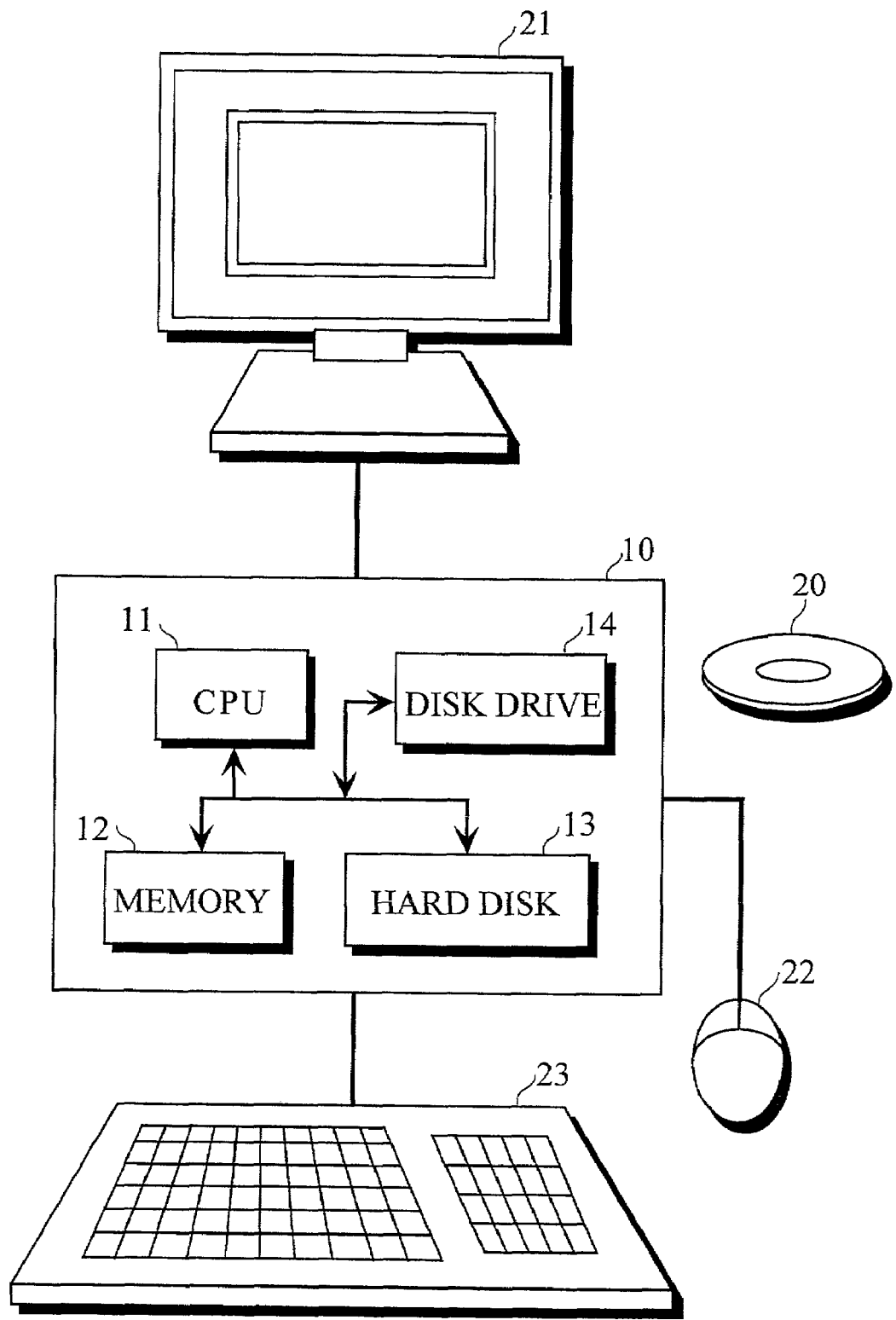
FIG. 7 is a block diagram showing the configuration of a microscopic image stitcher.

FIG. 7 illustrates the overall configuration of a microscopic image stitcher.

The microscopic image stitcher is realized by a personal computer. A display (monitor) 21, a mouse 22, a keyboard 23 are connected to the personal computer 10. The personal computer 10 comprises a CPU 11, a memory 12, a hard disk 13, a drive (a disk drive) 14 for a removable disk such as a CD-ROM (Compact Disc Read-Only Memory).

The hard disk 13 stores a microscopic image stitch processing program in addition to an OS (Operating System). The microscopic image stitch processing program is installed in the hard disk 13 using a CD-ROM 20 storing the program. It is assumed that the hard disk 13 previously stores a plurality of microscopic images to be stitched.

[2] Description of Procedure for Microscopic Image Stitch Processing Performed by CPU 11 in Case Where Microscopic Image Stitch Processing Program is Started A user picks up a plurality of microscopic images which are overlapped with each other while moving a stand or moving a sample by a camera having a microscope lens mounted thereon. The obtained plurality of microscopic images are stored in the hard disk 13.

Figure 8:
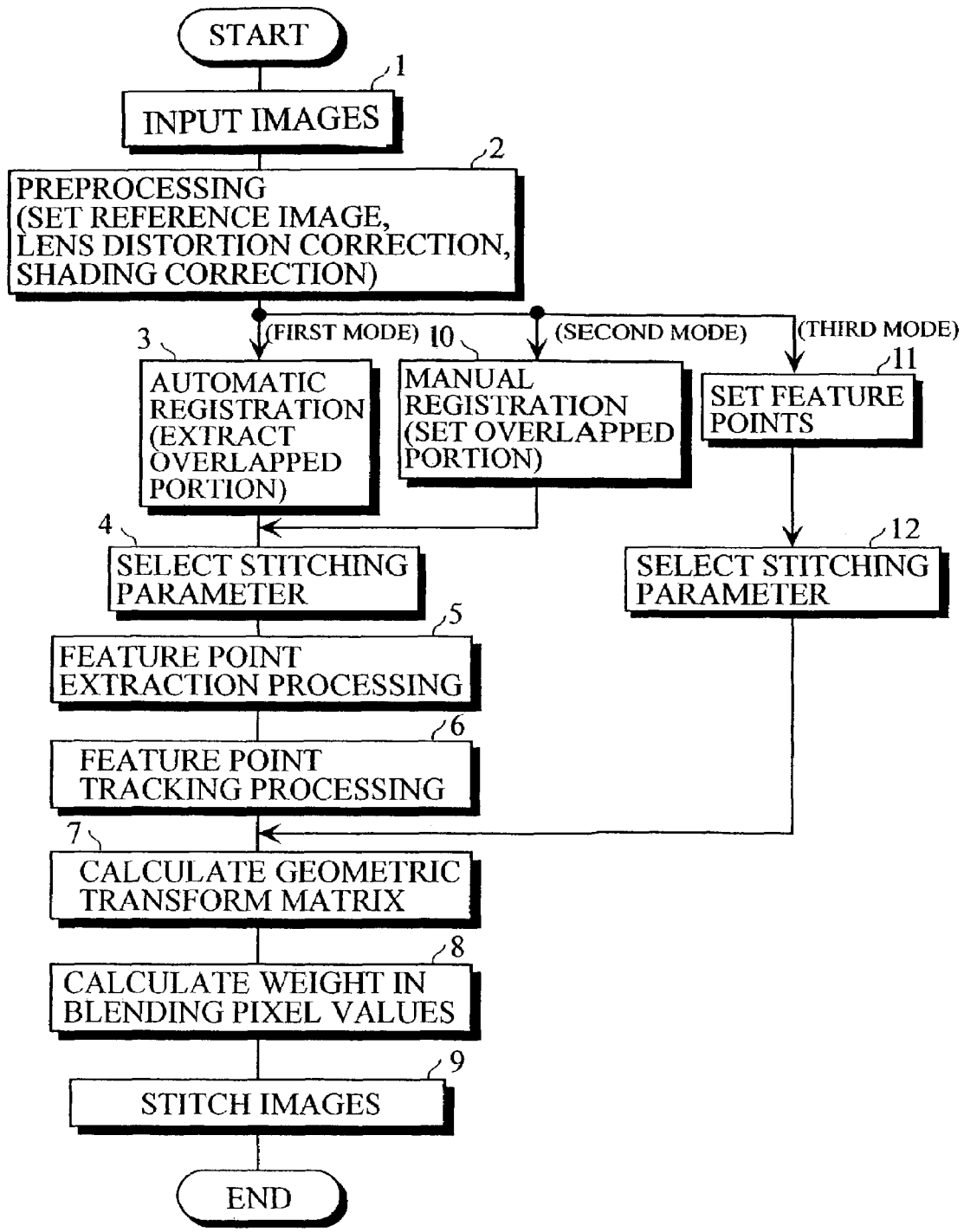
FIG. 8 is a flow chart showing the procedure for microscopic image stitch processing performed by a CPU 11 when a microscopic image stitch processing program is started.

FIG. 8 shows the overall procedure for processing performed by the CPU 11.

First, a plurality of microscopic images to be stitched (hereinafter referred to as images) are inputted (step 1). That is, the plurality of images to be stitched are selected, and the selected plurality of images are arranged on a monitor screen such that their respective arrangement positions conform to an actual positional relationship.

Each of the input images is then subjected to preprocessing (step 2). That is, the input image to be a reference surface for stitch processing is selected out of the input images, and the input image is subjected to lens distortion correction processing and shading correction processing.

Processing for joining the plurality of images which are subjected to lens distortion correction and shading correction is then performed. There are three image stitching modes.

The modes are a first mode in which the processing is automatically performed, a second mode in which registration between images (extraction of an overlapped portion between images) is manually set, and a third mode in which a correspondence of feature points between images is manually established.

In the first mode, automatic registration is performed after preprocessing (step 3). That is, rough registration (only parallel movement) of all input images is automatically performed, to display the result of the registration.

A user is then caused to select a stitching parameter (step 4). For example, the user is caused to choose which of stitching (translation) only by parallel movement and stitching (translation plus rotation) considering rotation around an optical axis in addition to parallel movement should be performed.

Thereafter, feature point extraction processing (step 5) and feature point tracking processing (step 6) are performed, and a geometric transform matrix is then calculated (step 7). A weight in blending pixel values is calculated (step 8), and the images are finally stitched (step 9).

The second mode is prepared in preparation for a case where the automatic registration in the first mode fails. In the second mode, manual registration is performed after the preprocessing (step 10). That is, for each pair of adjacent images selected from all the input images, registration (only parallel movement) between both the images is manually performed. Thereafter, the processing in the foregoing steps 4 to 9 is performed.

The third mode is prepared in preparation for a case where the stitching in the first mode or the second mode fails. In the third mode, the user is caused to set feature points after the preprocessing (step 11). That is, for each pair of adjacent images selected from all the input images, portions (feature points) which are desired to coincide with each other between both the images are manually set. The user is then caused to select a stitching parameter (step 12). Thereafter, the processing in the foregoing steps 7 to 9 is performed.

Description is now made of each of the steps.

[2] Description of Image Input (Step 1)

Figure 9:
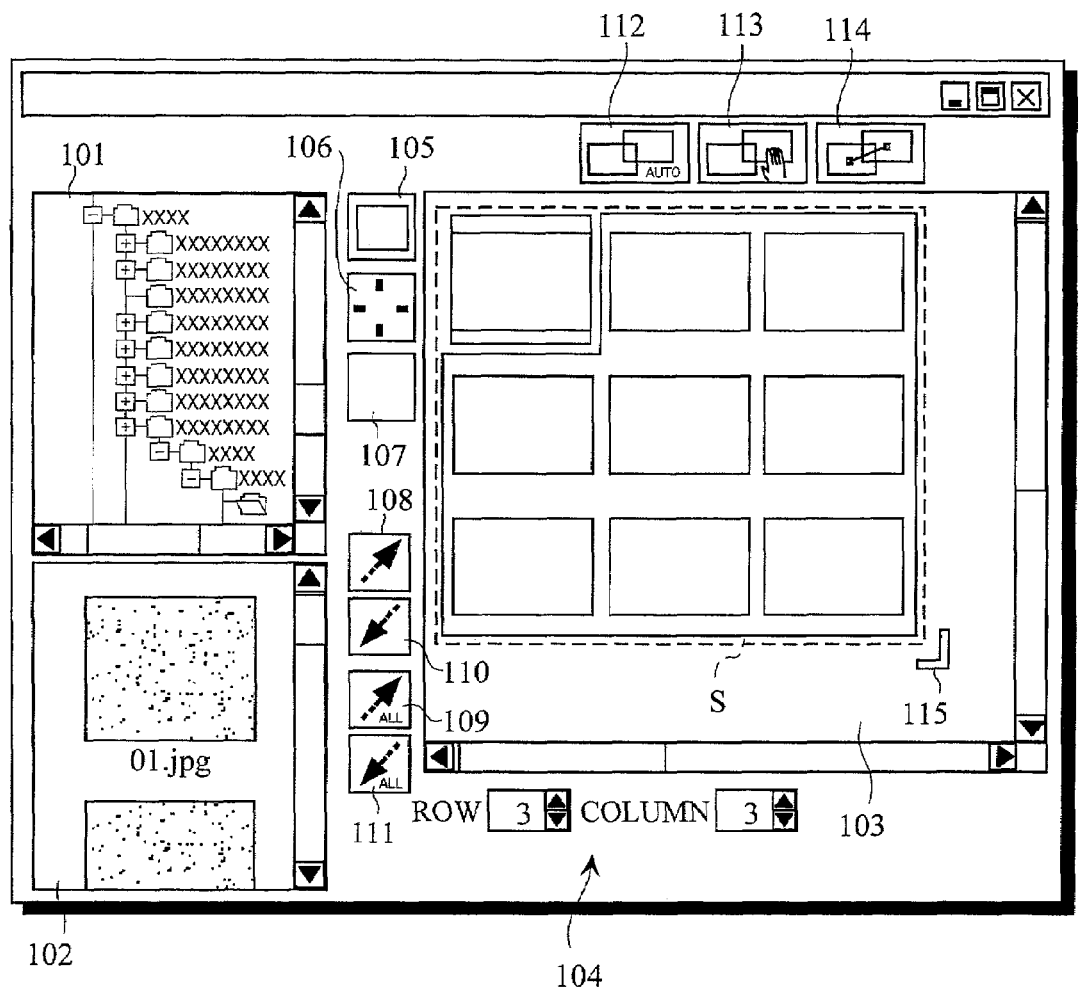
FIG. 9 is a schematic view showing an image input screen.

FIG. 9 illustrates an image input screen.

The image input screen comprises a folder tree display portion 101 for selecting an image folder storing images to be stitched, an image file display portion 102 for displaying an image file stored in the selected image folder, a work space 103, a matrix setting portion 104, a reference image selection button 105, a lens distortion correction button 106, a shading correction button 107, a selected image input button 108, an all-images input button 109, a selected image input release button 110, an all-images input release button 111, an automatic registration button 112, a manual registration button 113, a feature point setting button 114, and so forth.

Figure 10:
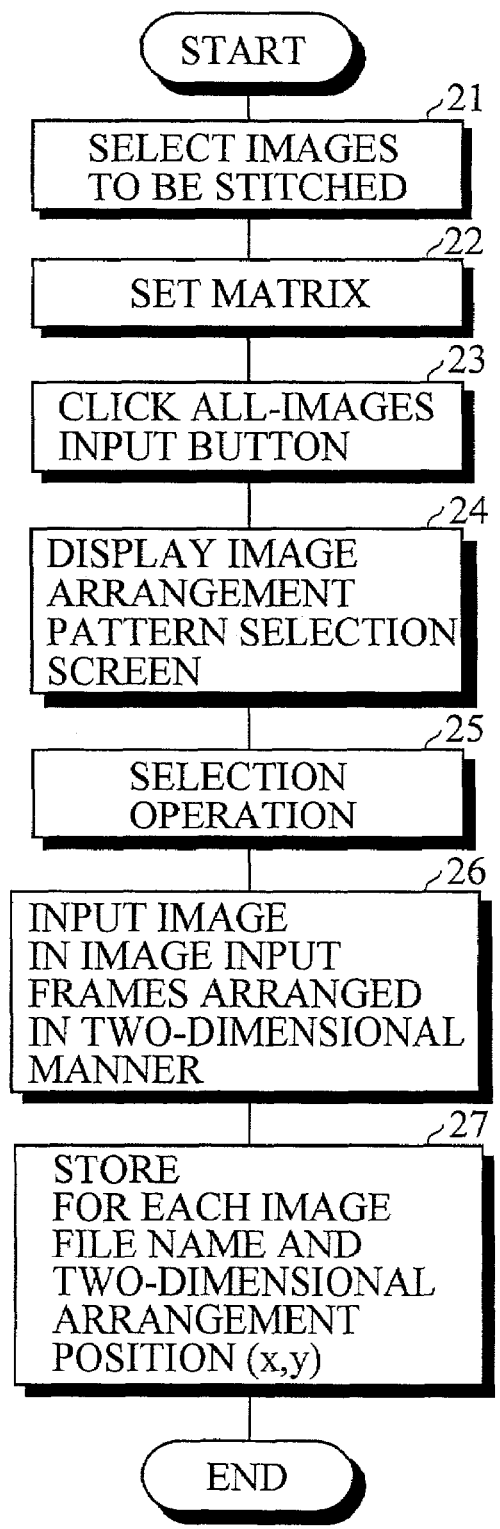
FIG. 10 is a flow chart showing the procedure for image input.

FIG. 10 shows the procedure for image input.

Images to be stitched are first selected (step 21). When the image folder storing the images to be stitched designated from the folder tree displayed in the folder tree display portion 101, the images stored in the designated image folder are displayed in the longitudinal direction in the image file display window 102. It is herein assumed that nine images are stored in the designated image folder, and the nine images are displayed in the image file display window 201 in the order of file names. The images may be displayed in the order in which they are photographed.

A matrix composing an image input frame displayed in the work space 103 is then set depending on the number of selected images, for example (step 22). The initial value of the matrix is 3 by 3, and an image input frame composed of a 3 by 3 matrix is displayed in the work space 103.

The matrix is set by pressing an Enter key after inputting the number of rows and the number of columns into the matrix setting portion 104 or dragging a control knob 115 at the lower right of an all-images input region S surrounding all image input frames, for example. An initial value "3" shall be maintained as both the number of rows and the number of columns. Consequently, the image input frame composed of a 3 by 3 matrix remains displayed in the work space 103.

Figure 11:
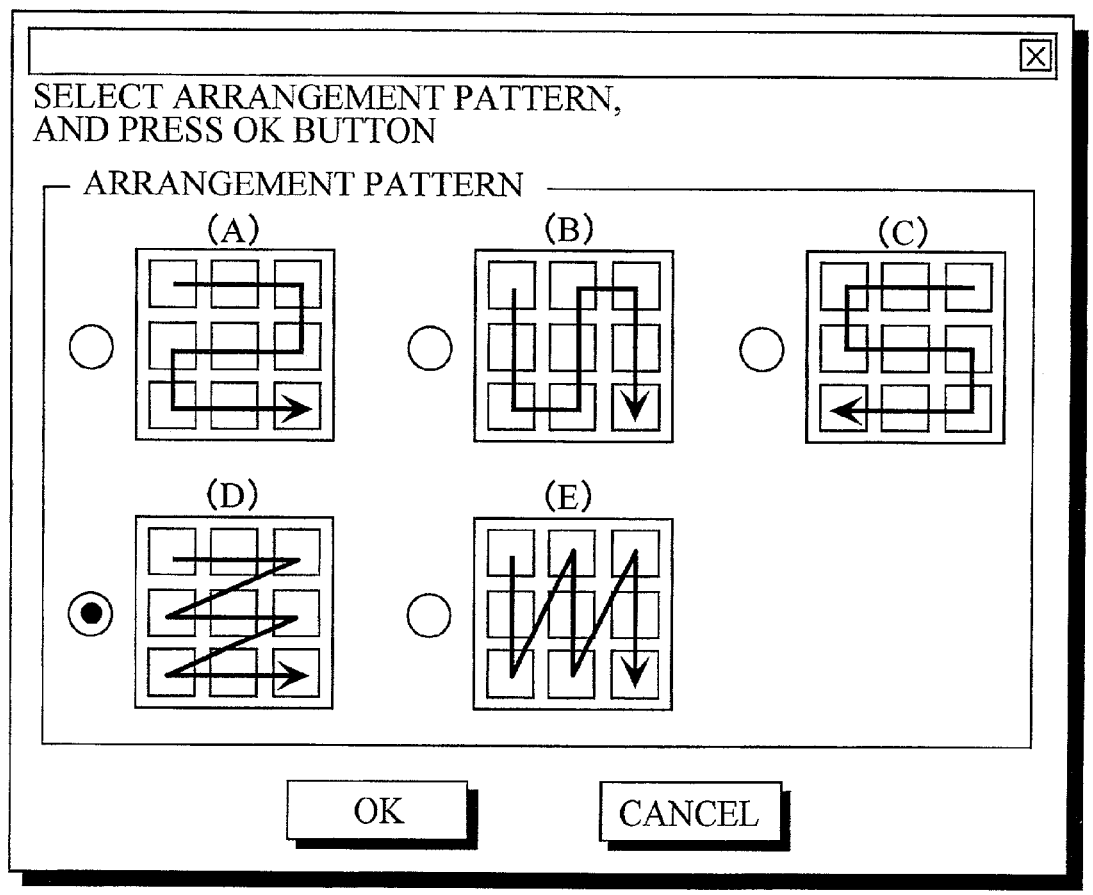
FIG. 11 is a schematic view showing an example of an image arrangement pattern selection screen.

When the all-images input button 109 is then clicked (step 23), an image arrangement pattern selection screen as shown in FIG. 11 is displayed on an image input screen (step 24).

On the image arrangement pattern selection screen, a plurality of types of image arrangement patterns A to E indicating what arrangement is used to input images displayed in the longitudinal direction in the image file display portion 102 into image input frames arranged in a two-dimensional manner, a radio button for selecting the image arrangement pattern, an OK button, and a cancel button are displayed.

There occurs a state where one of a plurality of radio buttons is selected. Immediately after an image stitching program is installed, there occurs a state where the radio button corresponding to a default image arrangement pattern previously determined is selected. After the image arrangement pattern is selected only once by the user, however, there occurs a state where the radio button corresponding to the image arrangement pattern most newly selected by the user is selected.

The user selects the image arrangement pattern such that the plurality of images displayed in the longitudinal direction on the image file display portion 102 are arranged in a two-dimensional manner in a state where they hold an actual relative positional relationship, and then clicks the OK button (step 25). As a result, each of the images displayed in the longitudinal direction in the image file display portion 102 is automatically inputted (displayed) in the image input frames arranged in a two-dimensional manner (step 26). That is, the images are arranged in a two-dimensional manner in a state where the images hold an actual relative positional relationship.

When nine images are represented by A1 to A9 in the order of files in which they are stored, the relationship between each of the image arrangement patterns A to E and their respective two-dimensional arrangement positions of the images A1 to A9 is as shown in FIG. 12.

When the plurality of images to be stitched are thus arranged in a two-dimensional manner, the name of the file in which each of the images is stored and the two-dimensional arrangement position (x, y) of the image (the position of the image input frame in which the image is inputted) are stored (step 27). The two-dimensional arrangement position (x, y) of each of the images is expressed in an XY coordinate system in which the upper left of the all-images input region S is taken as the origin, a direction rightward from the origin is taken as an x-direction, and a direction downward from the original is taken as a y-direction.

The user can input the images one at a time into each of the image input frames by a drag & drop or selection image input button 108.

Furthermore, the user can release the images inputted into the image input frame. When the all-images input release button 111 is pressed, all the input images are released. When the selected image input release button 110 is pressed after the input image is selected, the selected input image is released. Further, the input image can be released only by being dragged and dropped outward from the all-images input region S.

Figure 13:
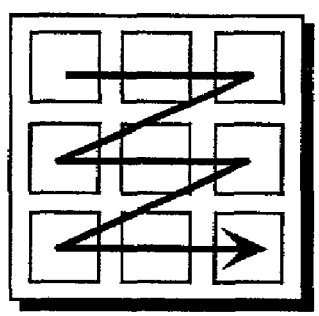
FIG. 13 is a schematic view showing an example of an image arrangement pattern.
Figure 13:
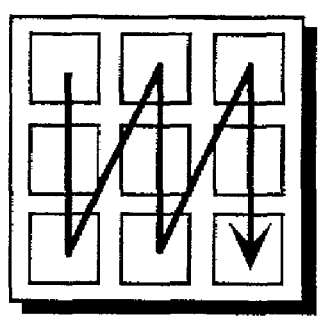
Figure 13:
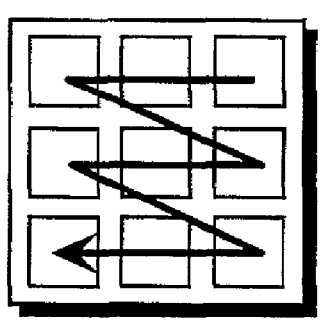
Figure 13:
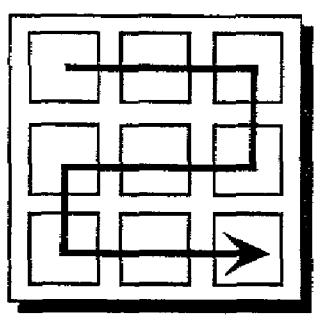
Figure 13:
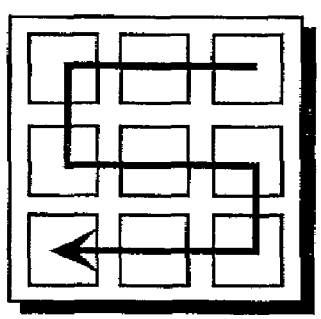
Figure 13:
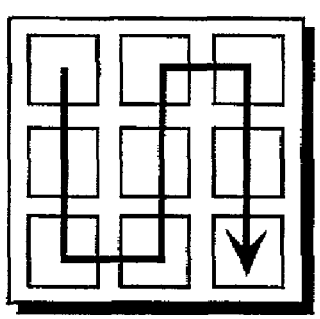
Figure 13:
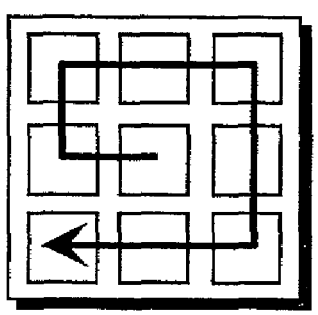
Figure 13:
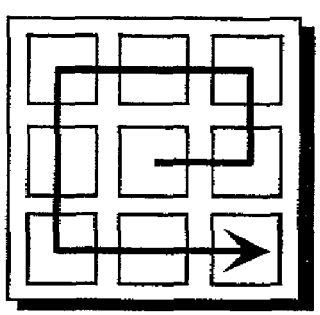
Figure 13:
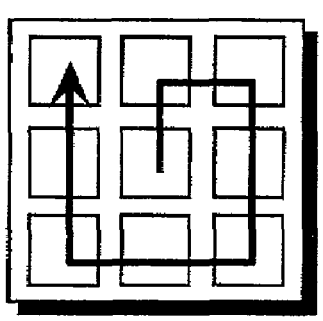

Examples of the image arrangement pattern include new row/new column patterns shown in FIGS. 13(*a*) to 13(*c*), turnback patterns shown in FIGS. 13(*d*) to 13(*f*), and spiral patterns shown in FIGS. 13(*g*) to 13(*i*).

[3] Description of Preprocessing (Step 2)

[3-1] Setting of Reference Image

In order to select a reference image, the reference image selection button 105 may be pressed after an input image to be a basis is selected.

[3-2] Lens Distortion Correction

When the user presses the lens distortion correction button 106 on the image input screen (FIG. 9), the input image is subjected to lens distortion correction processing.

A microscope lens is distorted in its peripheral part. A correction vector (du, dv) for eliminating the distortion is calculated using the following equation (10):

$$du = ku(u^2 + v^2)$$
$$dv = kv(u^2 + v^2) \tag{10}$$

Herein, u and v are coordinates in a case where the center of the image is used as the origin, and orthogonal coordinate axes are taken as U and V. Further, k is a lens distortion correction factor.

The coordinates (u, v) of the input image are transformed into coordinates (u', v') by the following equation (11) using the correction vector (du, dv), thereby correcting the distortion of the lens:

$$u' = u + du$$
$$v' = v + dv \tag{11}$$

Figure 14:
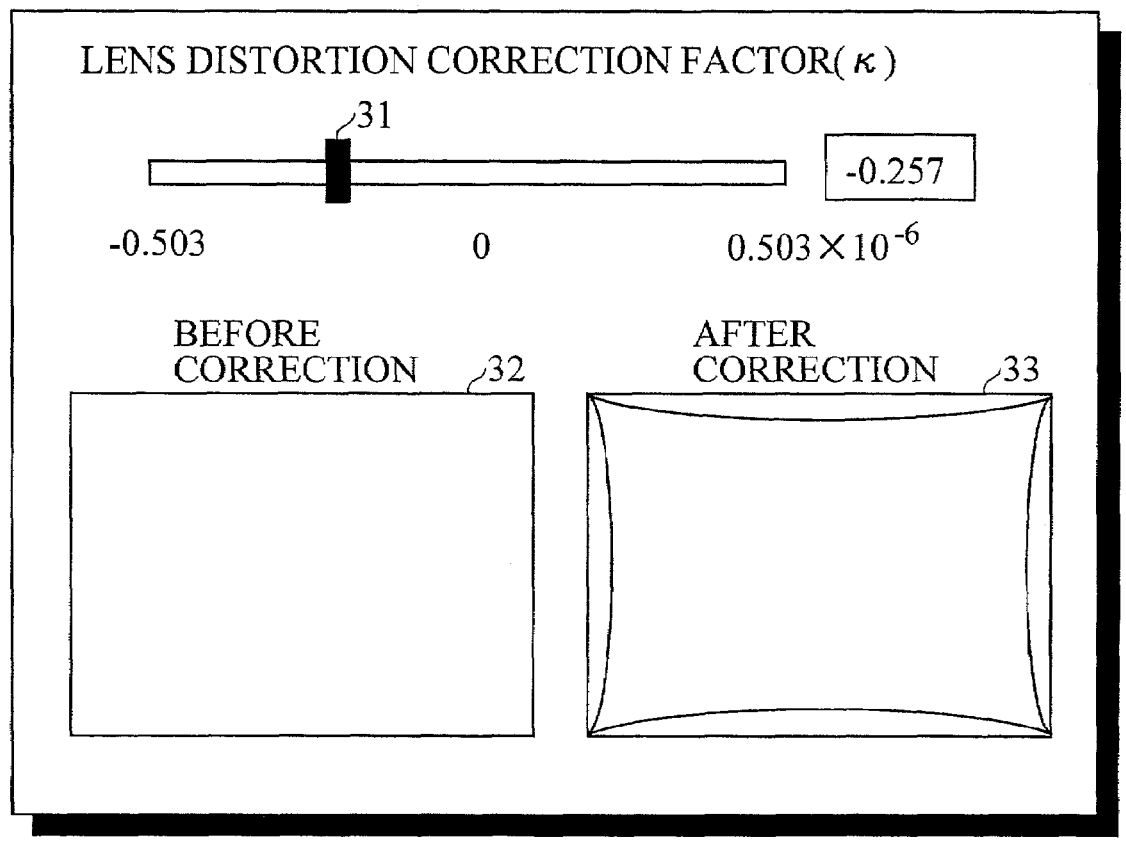
FIG. 14 is a schematic view showing an example of a lens distortion correction factor setting screen.

When the user presses the lens distortion correction button 106 on the image input screen (FIG. 9), a lens distortion factor setting screen as shown in FIG. 14 is displayed. The user sets a lens distortion correction factor k by operating a slider bar 31 on the lens distortion factor setting screen.

The lens distortion factor setting screen is provided with a region 32 on which an image before lens distortion correction is displayed and a region 33 on which an image after lens distortion correction is displayed. Therefore, the user can simultaneously see the image before lens distortion correction and the image after lens distortion correction. When the user sets the factor k using the slider bar 31, a transformed image (an image after lens distortion correction) is displayed in real time. Accordingly, the user can set the factor by a simple operation and by intuition.

[3-3] Shading Correction

When the user presses the shading correction button 107 on the image input screen (FIG. 9), the input image is subjected to shading correction processing.

In a microscopy imaging system, such shading that a peripheral part of an image is darkened is produced by setting an optical system. In order to correct the shading, for each pixel, a correction pixel value e(u, v) corresponding to the distance from the center of the image is calculated by the following equation (12):

$$e(u, v) = \frac{s(u^2 + v^2)}{R^2} \tag{12}$$

Herein, u and v are coordinates in a case where the center of the image is used as the origin, and orthogonal coordinate axes are taken as U and V. Further, s is a shading correction factor, and R is the distance from the center of the pixel at the greatest distance from the center of the image.

The pixel value I (u, v) of the input image is transformed into a pixel value I' (u, v) by the following equation (13) using the correction pixel value e (u, v), thereby correcting shading:

$$I'(u,v) = I(u,v) + e(u,v) \tag{13}$$

Figure 15:
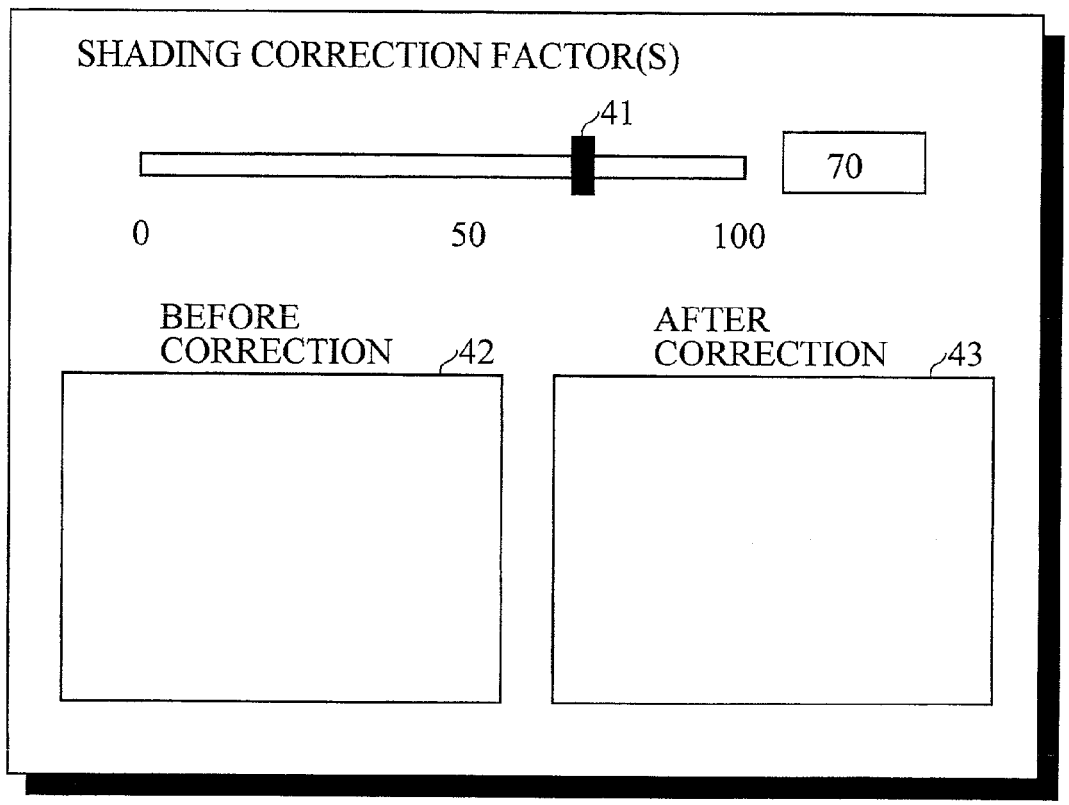
FIG. 15 is a schematic view showing an example of a shading correction factor setting screen.

When the user presses the shading correction button 107 on the image input screen (FIG. 9), a shading correction factor setting screen as shown in FIG. 15 is displayed on the display 21. The user sets a shading correction factor s by operating a slider bar 41 on the shading correction factor setting screen.

The shading correction factor setting screen is provided with a region 42 on which an image before shading correction is displayed and a region 43 on which an image after shading correction is displayed. Therefore, the user can simultaneously see the image before shading correction and the image after shading correction. When the user sets the factor s using the slider bar 41, a transformed image (an image after shading correction) is displayed in real time. Accordingly, the user can set the factor by a simple operation and by intuition.

[4] Description of Automatic Registration (Step 3)

Figure 16:
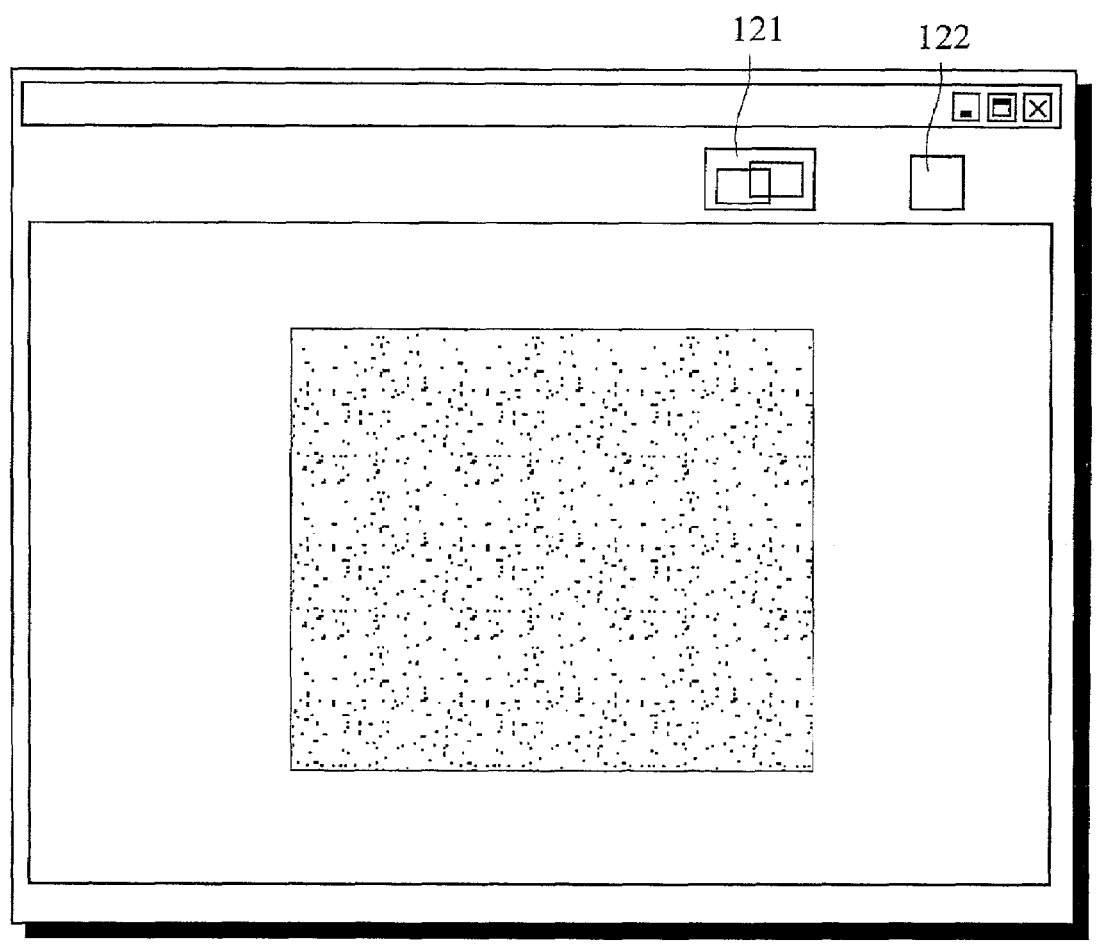
FIG. 16 is a schematic view showing an example of an automatic registration result display screen.

When the user presses the automatic registration button 112 on the image input screen (FIG. 9), automatic registration processing is performed, so that an automatic registration result display screen including the result of the registration is displayed, as shown in FIG. 16. On the automatic registration result display screen, an automatic stitch button 121, a cancel button 122, and so forth are also displayed in addition to the result of the registration.

In the automatic registration processing, a pair of adjacent images from which an overlapped portion should be extracted is first determined, and the overlapped portion is then extracted for each pair of adjacent images. Thereafter, all the images are registered using only parallel movement on the basis of the overlapped portion extracted for each pair of adjacent images. The result of the registration is displayed.

A method of determining a pair of adjacent images from which an overlapped portion is to be extracted will be described in the manual registration (step 10). Processing for extracting the overlapped portion is performed in the following way. For convenience of illustration, description is herein made of a case where an overlapped portion of one pair of adjacent images (a first image A1 and a second image A2) is extracted.

The processing for extracting the overlapped portion is performed on the basis of an SSD (Sum of Squared Difference) or a normalized cross-correlation method, for example.

(a) Description of SSD Method

In the SSD method, with respect to two images A1 and A2 from which an overlapped portion should be extracted, images $I_1$ and $I_2$ having lower resolutions than those of the original images are first respectively produced. An overlapped portion ω (size: M×N) of the two images $I_1$ and $I_2$ having low resolutions is found using a square error (E) per pixel, as expressed by the following equation (14). An amount of movement (d) between the images is changed in an allowable range, and the overlapped portion is extracted from the amount of movement (d) in a case where E is the smallest.

$$E(d) = \frac{\sum_\omega (I_1(x) - I_2(x+d))^2}{M \times N} \quad (14)$$

(b) Description of Normalized Cross-Correlation Method

In the normalized cross-correlation method, with respect to two images A1 and A2 from which an overlapped portion should be extracted, images $I_1$ and $I_2$ having lower resolutions than those of the original images are first respectively produced. An overlapped portion ω (size: M×N) of the two images $I_1$ and $I_2$ having low resolutions is found using a normalized cross-correlation coefficient C, as expressed by the following equation (15). An amount of movement (d) between the images is changed in an allowable range, and the overlapped portion is extracted from the amount of movement (d) in a case where C is the largest.

$$C(d) = \frac{\sum_\omega (I_1(x) - \bar{I}_1)(I_2(x+d) - \bar{I}_2)}{\sqrt{\sigma_1 \cdot \sigma_2}} \quad (15)$$

In the equation (15), $\bar{I}_1$ and $\bar{I}_2$ are averages of respective gray scale values of a first image $I_1$ and a second image $I_2$ in the overlapped portion of both the images in a case where the first image is fixed and the second image is moved by d. $\delta_1$ and $\delta_2$ are respective variances of the gray scale values of the first image $I_1$ and the second image $I_2$ in the overlapped portion of both the images in a case where the first image is fixed and the second image is moved by d.

Figure 17:
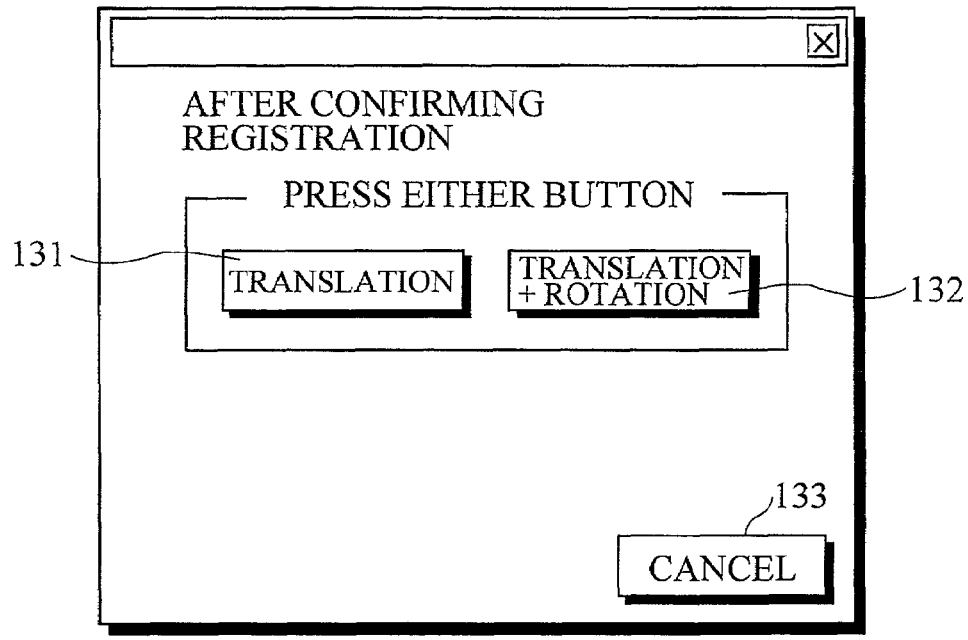
FIG. 17 is a schematic view showing an example of a stitching parameter selection screen.

When the user presses the automatic stitch button 121 on the automatic registration result display screen (FIG. 16), a stitching parameter selection screen as shown in FIG. 17 is displayed, whereby the user selects a stitching parameter (the processing in the step 4 shown in FIG. 8). On the stitching parameter selection screen, a "translation" button 131, a "translation+rotation" button 132, a cancel button 133, and so forth are displayed. When the user presses either the "translation" button 131 or the "translation+rotation" button 133, the processing in the steps 5 to 9 (see FIG. 8) is performed, so that all the images are stitched.

[5] Description of Manual Registration (Step 10)

Figure 18:
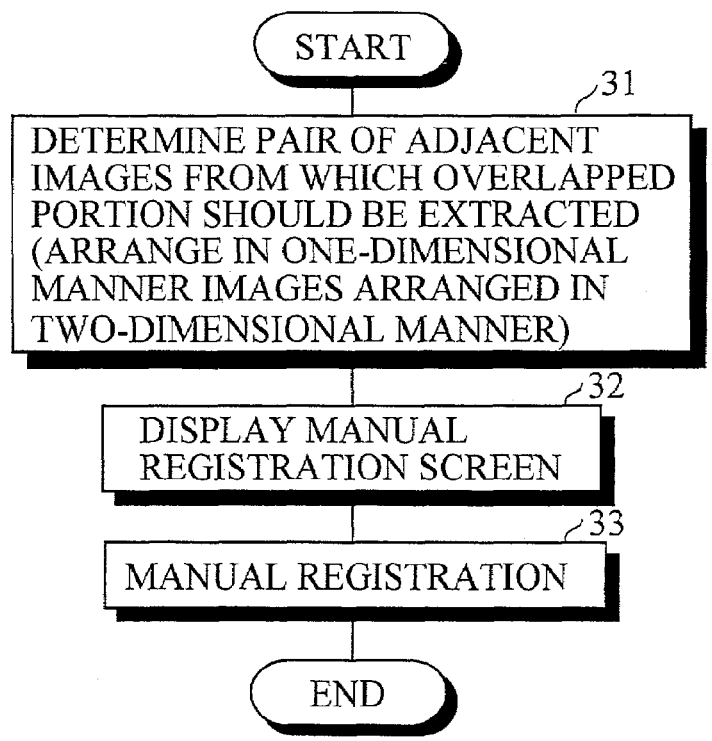
FIG. 18 is a flow chart showing the procedure for manual registration processing.

FIG. 18 shows the procedure for manual registration processing performed when the user presses the manual registration button 113 on the image input screen (FIG. 9).

When the user presses the manual registration button 113 on the image input screen (FIG. 9), a pair of adjacent images from which an overlapped portion should be extracted is determined (step 31).

Figure 19:
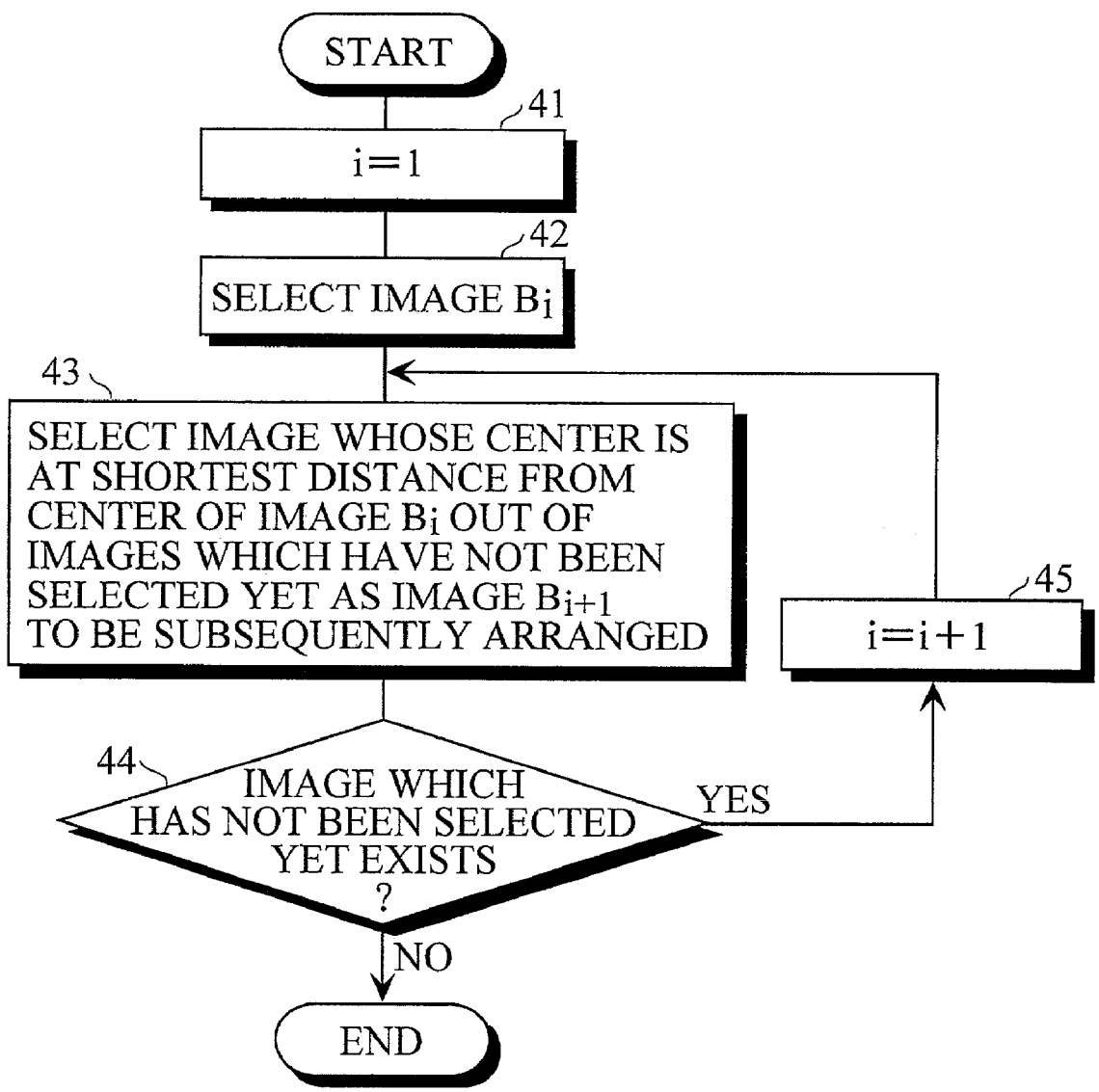
FIG. 19 is a flow chart showing the procedure for processing for determining a pair of adjacent images.

FIG. 19 shows the procedure for processing for determining a pair of adjacent images.

A pair of adjacent images is determined by arranging in a one-dimensional manner images arranged in a two-dimensional manner such that the adjacent images are overlapped with each other.

The number of each of images arranged in a one-dimensional manner is represented by i. First, i=1 (step 41), and an image $B_i$ at the head (first) of the images in the one-dimensional arrangement is selected from the images arranged in a two-dimensional manner (step 42). For example, an image at a position (0,0) is selected as the image $B_i$ at the head of the one-dimensional arrangement.

It is then assumed that the images arranged in a two-dimensional manner are arranged without no space therebetween, to select the image whose center is at the shortest distance from the center of the image $B_i$ out of the images which have not been selected yet as an image $B_{i+1}$ to be subsequently arranged (step 43).

It is judged whether or not the image which has not been selected yet remains (step 44). When the image which has not been selected yet remains, i=i+1 (step 45). Thereafter, the program is returned to the step 43.

The processing in the steps 43, 44, and 45 is thus repeatedly performed until all the images are selected, whereby the images arranged in a two-dimensional manner are arranged in a one-dimensional manner such that the adjacent images are overlapped with each other. The adjacent ones of the images arranged in a one-dimensional manner constitute a pair of adjacent images from which an overlapped portion is to be extracted.

In this example, each of the images arranged in a two-dimensional manner is longer in the transverse direction. Accordingly, the distance between the center points of the two images arranged in the longitudinal direction is shorter than the distance between the center points of the two images arranged in the transverse direction. Even when the image, which has not been selected yet, adjacent to the image $B_i$ in the longitudinal direction exists, for example, therefore, the image, which has not been selected yet, adjacent to the image $B_i$ in the longitudinal direction is selected as an image $B_{i+1}$. Further, when the image, which has not been selected yet, adjacent to the image $B_i$ in the longitudinal direction does not exist, and the image, which has not been selected yet, adjacent to the image $B_i$ in the transverse direction exists, for example, the image, which has not been selected yet, adjacent to the image $B_i$ in the transverse direction is selected as an image $B_{i+1}$.

Figure 20:
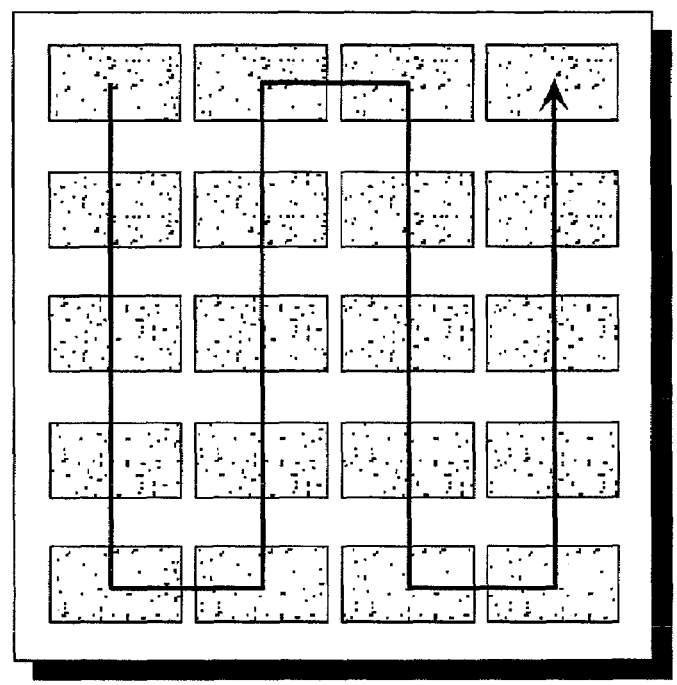
FIG. 20 is a schematic view showing the order of one-dimensional arrangement determined by processing for determining a pair of adjacent images.

When 20 images are arranged in five rows and four columns, for example, as shown in FIG. 20, the images are arranged in a one-dimensional manner in the order indicated by an arrow in FIG. 20.

Figure 21:
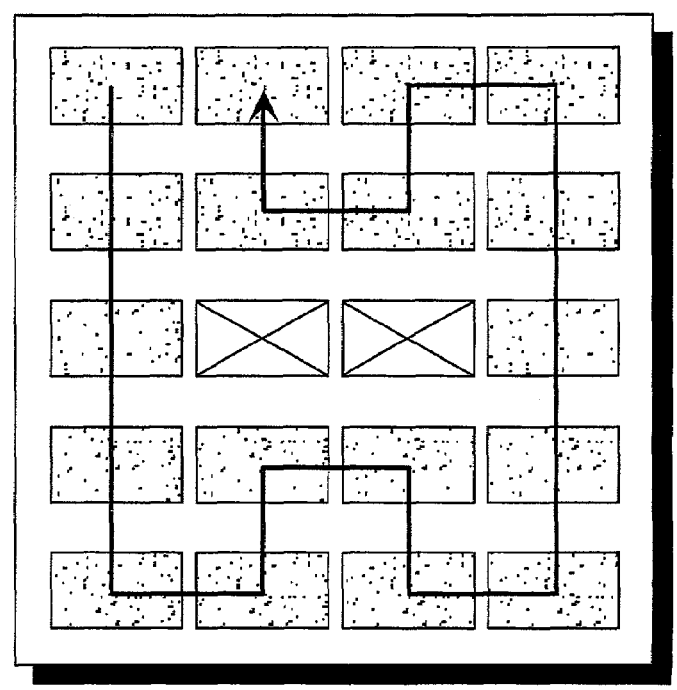
FIG. 21 is a schematic view showing the order of one-dimensional arrangement determined by processing for determining a pair of adjacent images.

When there exist no images in the two image input frames at the center (the image input frames at a position (2, 3) and a position (3, 3)) out of the image input frames arranged in five rows and four columns, as shown in FIG. 21, however, the images are arranged in a one-dimensional manner in the order indicated by an arrow in FIG. 21.

Figure 22:
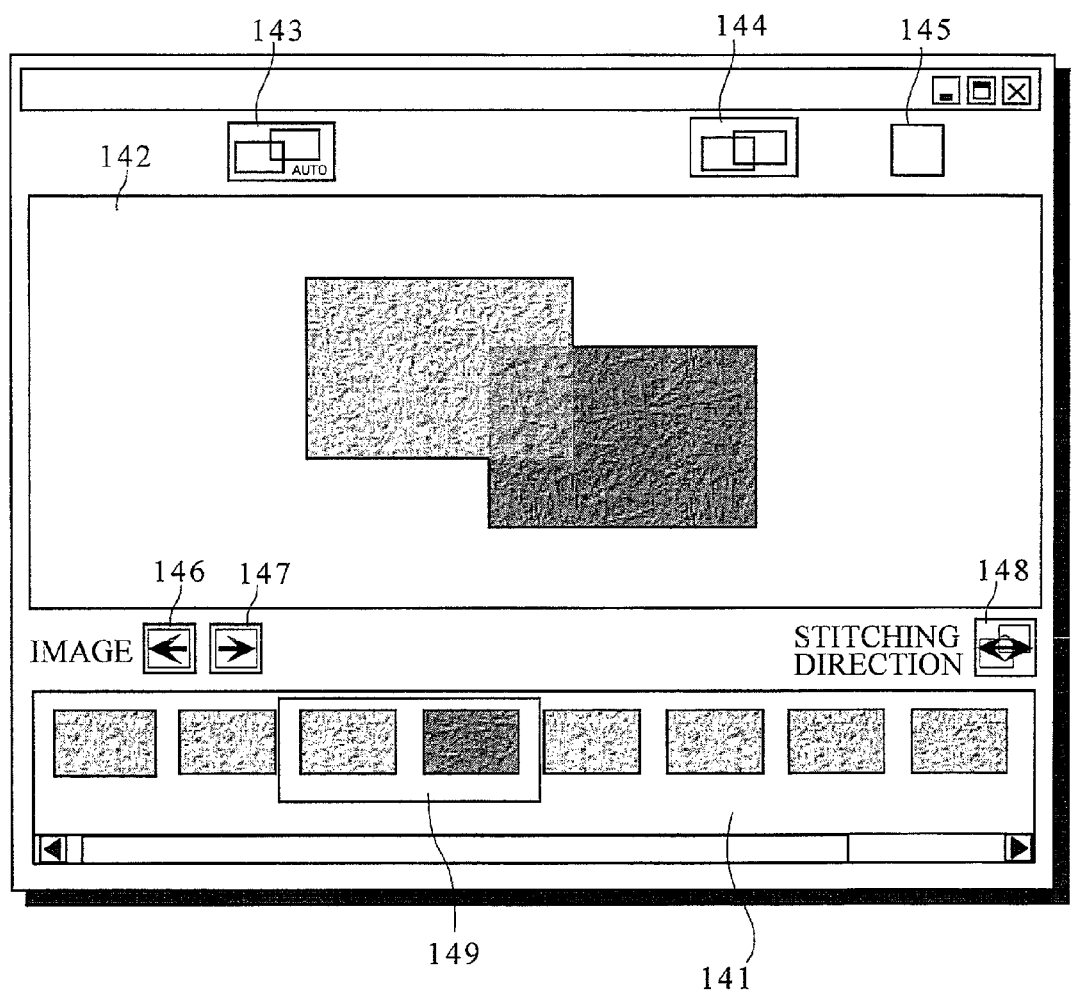
FIG. 22 is a schematic view showing an example of a manual registration screen.

When the images arranged in a two-dimensional manner are arranged in a one-dimensional manner such that the adjacent images are overlapped with each other, a manual registration screen as shown in FIG. 22 is displayed (step 32, FIG. 18).

The manual registration screen comprises an automatic registration button 143, an automatic stitch button 144, a cancel button 145, and so forth in addition to a one-dimensional arrangement image display portion 141 and a work space 142.

The one-dimensional arrangement image display portion 141 is provided in the lower stage, and the work space 142 is provided on the upper side of the one-dimensional arrangement image display portion 141. Between the one-dimensional arrangement image display portion 141 and the work space 142, two pair selecting keys 146 and 147 for selecting a pair of adjacent images to be registered are displayed, and a stitching direction indication mark 148 representing the relative positional relationship (the stitching direction) of the selected pair of adjacent images is displayed.

Each of the images arranged in a one-dimensional manner is displayed in the one-dimensional arrangement image display portion 141. Two images selected as the pair of adjacent images out of the images displayed in a one-dimensional arrangement in the one-dimensional arrangement image display portion 141 are displayed translucently in the work space 142.

In the one-dimensional arrangement display portion 141, a rectangular frame 149 surrounding the pair of adjacent images currently selected is displayed in order to clearly show the pair of adjacent images currently selected. When the pair selecting key 146 is clicked, the pair of adjacent images is shifted by one image leftward. When the pair selecting key 147 is clicked, the pair of adjacent images is shifted by one image rightward.

Figure 23:
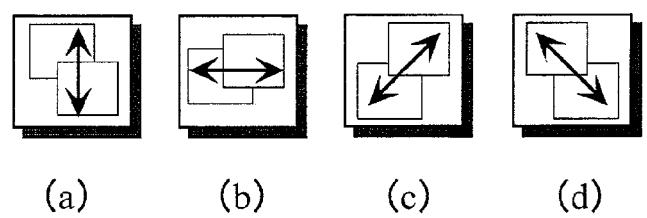
FIG. 23 is a schematic view showing the type of a stitching direction indication mark.

As shown in FIG. 23, examples of the stitching direction indication mark 148 are of four types: a mark in an upward and downward direction (a), a mark in a rightward and leftward direction (b), a mark in an oblique direction (c) connecting the lower left and the upper right, and an oblique direction (d) connecting the upper left and the lower right.

The direction in which the selected pair of adjacent images is stitched is determined on the basis of the two-dimensional arrangement positions of the two images. The two-dimensional arrangement position of one of the images in the pair of adjacent images is taken as (x1, y1), and the two-dimensional arrangement position of the other image is taken as (x2, y2).

If $x1=x2$, the stitching direction is the upward and downward direction. If $y1=y2$, the stitching direction is the rightward and leftward direction. If $(x1-x2) \times (y1-y2) < 0$ in the case of $x1 \neq x2$ and $y1 \neq y2$, the stitching direction is the oblique direction connecting the lower left and the upper right. If $(x1-x2)-(y1-y2)>0$ in the case of $x1 \neq x2$ and $y1 \neq y2$, the stitching direction is the oblique direction connecting the upper left and the lower right.

When the manual registration screen (FIG. 22) is displayed, the user selects the pair of adjacent images, and then manually registers an overlapped portion of the two images translucently displayed in the work space 142 by visual observation after selecting the pair of adjacent images (step 33, FIG. 18). The operation is performed by dragging one of the two images translucently displayed in the work space 142 using a mouse. The operation can be also performed by operating keys in a keyboard. The work in the step 33 is performed with respect to all the pairs of adjacent images, thereby terminating the manual registration.

When the automatic registration button 143 is pressed in a state where the two images are translucently displayed in the work space 142, the two images translucently displayed in the work space 142 are automatically registered by the same processing as the above-mentioned automatic extraction processing of the overlapped portion.

When the user presses the automatic stitch button 144 after registering all the pairs of adjacent images, the stitching parameter selection screen as shown in FIG. 17 is displayed, whereby the user selects a stitching parameter (the processing in the step 4 shown in FIG. 8). When the user presses either one of the "translation" button 131 or the "translation+rotation" button 132 on the stitching parameter selection screen, the processing in the steps 5 to 9 (see FIG. 8) is performed, thereby stitching all the images.

[6] Description of Setting of Feature Points (Step 11)

Figure 24:
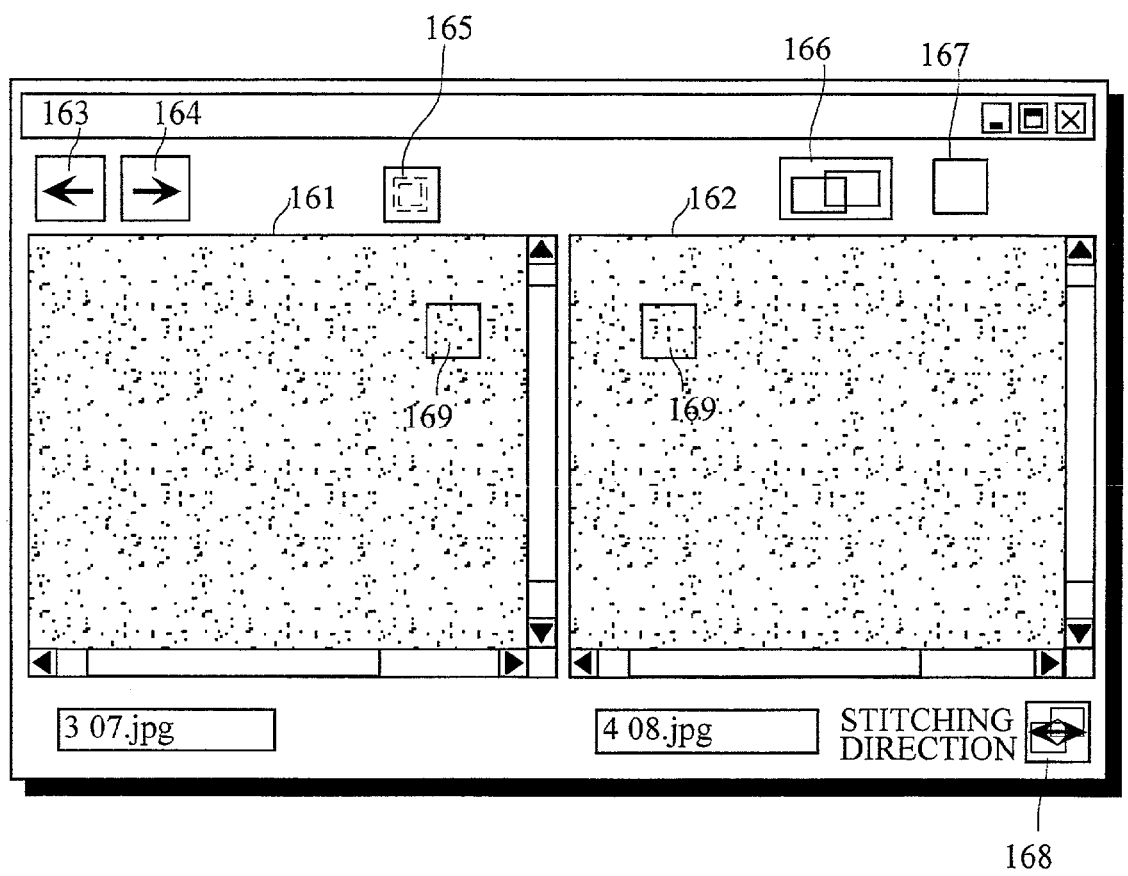
FIG. 24 is a schematic view showing an example of a feature point setting screen.

When the user presses the feature point setting button 114 on the image input screen (FIG. 9), the pair of adjacent images from which an overlapped portion should be extracted is determined and then, a feature point setting screen as shown in FIG. 24 is displayed.

Each of the pairs of adjacent images is determined by the same processing as the processing in the step 31 in the manual registration processing (FIG. 18).

The feature point setting screen comprises two image display portions 161 and 162 for respectively displaying in enlarged fashion two images composing the pair of adjacent images, two pair selecting keys 163 and 164 for selecting the pair of adjacent images, a feature point delete button 165, and an automatic stitch button 166, a cancel button 167, and so forth. A stitching direction indication mark 168 representing the relative positional relationship (the stitching direction) of the selected pair of adjacent images is displayed at the lower right of the feature point setting screen.

The pair selecting keys 163 and 164 and the stitching direction indication mark 168 have the same functions as those of the pair selecting keys 146 and 147 and the stitching direction indication mark 148 on the manual registration screen (FIG. 22).

The user establishes a correspondence between feature points on the basis of the two images displayed on the two image display portions 161 and 162. Specifically, when the position of the arbitrary feature point on the image on the right side is double-clicked, a feature point setting frame (a rectangular frame) 169 is displayed on both the images. The feature point setting frame 169 displayed on the image on the left side is dragged using the mouse, thereby moving the feature point setting frame 169 to a position corresponding to the feature point on the right image. When the feature point delete button 165 is pressed, the feature point setting frame which is being selected is deleted.

One or more feature points are set between the two images when the "translation" is selected as the stitching method, while two or more feature points are set between the two images when the "translation plus rotation" is selected as the stitching method. The larger the number of set feature points is, the more greatly the stitching accuracy is improved.

When the user presses the automatic stitch button 166 after the feature points are set with respect to all the pairs of adjacent images, the stitching parameter selection screen as shown in FIG. 17 is displayed, whereby the user selects a stitching parameter (the processing in the step 12 shown in FIG. 8). When the user presses either one of the "translation" button 131 and the "translation + rotation" button 132 on the stitching parameter selection screen, the processing in the steps 7 to 9 (see FIG. 8) is performed, thereby stitching all the images.

[7] Description of Feature Point Extraction Processing (Step 5)

When the processing in the foregoing step 4 is terminated, that is, the user presses either one of the "translation" button 131 and the "translation + rotation" button 132 on the stitching parameter selection screen (see FIG. 17) displayed in the step 4, feature point extraction processing is performed.

For convenience of illustration, description is made of only processing corresponding to one pair of adjacent images A1 and A2. A plurality of partial images (a rectangular region) effective for tracking are extracted as feature points from an overlapped portion of the first image A1 and the second image A2. The feature points are extracted so as not to be overlapped with each other. Specifically, a portion having a high eigenvalue $\lambda_{min}$ (see an equation 8), described above, is extracted as the feature point.

[8] Description of Feature Point Tracking Processing (Step 6)

When the feature point extraction processing for each of the pairs of adjacent images is terminated, feature point tracking processing is performed. That is, a position, on the second image A2, corresponding to the extracted feature point on the first image A1 is tracked.

Specifically, an optical flow vector for each patch of a suitable size (e.g., 13×13) is found by the optical flow estimation method (see a column [2] in the description of the prior art) developed by the applicant of the present invention. A position, on the second image A2, corresponding to the feature point on the first image A1 is found in not less than a pixel unit by linear interpolation from flow vectors for patches at four vicinities of the feature point on the first image A1. Consequently, the coordinates of a corresponding point of both the images are obtained in the overlapped portion of the first image A1 and the second image A2.

[9] Description of Processing for Calculating Geometric Transform Matrix (Step 7)

Description is made of a case where the second image A2 is joined to the first image A1. A geometric transform matrix (a geometric transform factor) for transforming the coordinates of each of pixels in the second images A2 into coordinates on the first image A1 is calculated on the basis of the coordinates of a corresponding point of the first image A1 and the second image A2 which are automatically found in the foregoing step 6 at the time of the first mode or the second mode and the coordinates of a corresponding point of the first image A1 and the second image A2 which are manually found in the foregoing step 11 at the time of the third mode.

When the first image A1 is joined to the second image A2, a geometric transform matrix (a geometric transform factor) for transforming the coordinates of each of pixels in the first image A1 into coordinates on the second image A2 may be calculated.

A matrix for two-dimensional parallel movement is used as the geometric transform matrix when the "translation" is selected by the stitching parameter calculation processing (the step 4 or the step 12), while a two-dimensional rigid transform matrix is used as the geometric transform matrix when the "translation plus rotation" is selected.

Although in this step, the coordinates of each of pixels in the second image A2 are not transformed into coordinates on the first image A1, an equation for transforming the coordinates (x, y, 1) of each of the pixels in the second image A2 into coordinates on the first image A1 is expressed by the following equation (16) or (17). Herein, the coordinates (x, y) and (x', y') are the coordinates of the pixels in the image, which differ from the coordinates (x, y) representing the two-dimensional arrangement position of the image used in the description of the step 1 shown in FIG. 8:

$$\begin{pmatrix} x' \\ y' \\ 1 \end{pmatrix} = k \begin{pmatrix} 0 & 0 & tx \\ 0 & 0 & ty \\ 0 & 0 & 1 \end{pmatrix} \begin{pmatrix} x \\ y \\ 1 \end{pmatrix} \quad (16)$$

$$\begin{pmatrix} x' \\ y' \\ 1 \end{pmatrix} = k \begin{pmatrix} \cos\theta & -\sin\theta & tx \\ \sin\theta & \cos\theta & ty \\ 0 & 0 & 1 \end{pmatrix} \begin{pmatrix} x \\ y \\ 1 \end{pmatrix} \quad (17)$$

The foregoing equation (16) expresses a conversion equation in a case where a matrix for two-dimensional parallel movement is used as the geometric transform matrix, and the foregoing equation (17) expresses a conversion equation in a case where a two-dimensional rigid transform matrix is used as the geometric transform matrix.

In the foregoing equation (16), $(t_x, t_y)$ indicates the amount of parallel movement, and k is an arbitrary constant which is not zero. In the foregoing equation (17), $(t_x, t_y)$ indicates the amount of parallel movement, $\theta$ indicates an angle of rotation, and k is an arbitrary constant which is not zero.

[10] Description of Processing for Calculating Weight in Blending Pixel Values (Pixel Value Blending Factor) (Step 8)

When a plurality of images are picked up while moving a sample stand or moving a sample on the sample stand using a camera having a microscope lens mounted thereon, the images differ in brightness by operating an automatic exposure control function.

In a region where the first image and the second image which should be joined to each other are overlapped with each other, processing for blending the respective pixel values in the images is performed as post processing. The pixel value blending processing is processing for making the difference in brightness inconspicuous by smoothly changing between both the images the pixel values in an overlapped region of the images. The processing can simultaneously make a stitching error by geometric transform inconspicuous.

In the present embodiment, the pixel values in the overlapped region of both the images are blended on the basis of the distance from the center of gravity of each of the images.

A center of gravity $G_1$ of the first image is first found. Further, a center of gravity $G_2$ of the second image is found on the basis of the conversion equation used for joining (the foregoing equation (16) or the foregoing equation (17)) on a composite image obtained by joining the second image to the first image.

The positions of four vertexes (four corners) of the first image are then respectively found. Further, the positions of four vertexes of the second image are found on the basis of the conversion equation used for joining (the foregoing equation (16) or the foregoing equation (17)) on the composite image obtained by joining the second image to the first image. Consequently, the positions of the four vertexes of the first image and the positions of the four vertexes of the second image on the composite image are found, thereby extracting an overlapped region of the first image and the second image on the composite image.

Depending on the respective distances from each of the pixels in the overlapped region of the first image and the second image on the composite image (a pixel value blending object pixel) to the centers of gravity $G_1$ and $G_2$ of the first image and the second image, a weight on the pixel value of the pixel value blending object pixel is determined. The weight is determined such that the pixel value of the pixel value blending object pixel in the image whose center of gravity is at the shorter distance from the pixel value blending object pixel is increased.

That is, letting $d_1$ be the Euclidean distance from the coordinates of the pixel value blending object pixel in the overlapped region of the first image and the second image on the composite image to the center of gravity $G_1$ of the first image on the composite image, and $d_2$ be the Euclidean distance therefrom to the center of gravity $G_2$ of the second image on the composite image, a weight $w_1$ on the pixel value of the pixel value blending object pixel in the first image and a weight $w_2$ on the pixel value thereof in the second image are expressed by the following equation (18):

$$w_1 = \frac{d_2}{d_1 + d_2} \quad (18)$$

$$w_2 = \frac{d_1}{d_1 + d_2}$$

The weights $w_1$ and $w_2$ are respectively calculated on the basis of the equation (18) with respect to the pixel value blending object pixel, to produce a table (a weight table) listing the weights $w_1$ and $w_2$ on the pixel value blending object pixel.

[12] Description of Pixel Stitch Processing (Step 9)

In the image stitch processing, the second image is drawn on a coordinate system of the first image using the foregoing equation (16) or the foregoing equation (17).

In this case, pixel values $P_1$ and $P_2$ in the overlapped region of the first image and the second image are blended on the basis of the weight table obtained in the step 8. That is, the pixel value $P_i$ of each pixel value blending object pixel is calculated by the following equation (19):

$$P_i = w_1 P_1 + w_2 P_2 \quad (19)$$

When stitch processing for all pairs of adjacent images is thus terminated, a composite image display screen including a certain composite image which is the result of the stitching is displayed.

According to the above-mentioned embodiment, an operation in arranging a plurality of images picked up in a two-dimensional manner on a monitor screen so as to correspond to an actual positional relationship is simplified, and errors in the arrangement of the images does not easily occur.

[B] DESCRIPTION OF SECOND EMBODIMENT

The overall configuration of a microscopic image stitcher is the same as that shown in FIG. 7.

A hard disk 13 stores a microscopic image stitch processing program in addition to an OS (Operating System) or the like. The microscopic image stitch processing program is installed in the hard disk 13 using a CD-ROM 20 storing the program. It is assumed that the hard disk 13 previously stores a plurality of microscopic images to be stitched.

In the second embodiment, image data related to the plurality of images picked up by a microscope are stored in the hard disk 13. Further, information related to the respective two-dimensional arrangements, which conform to an actual relative positional relationship, of the images are related to the image data and are stored in the hard disk 13.

Figure 25:
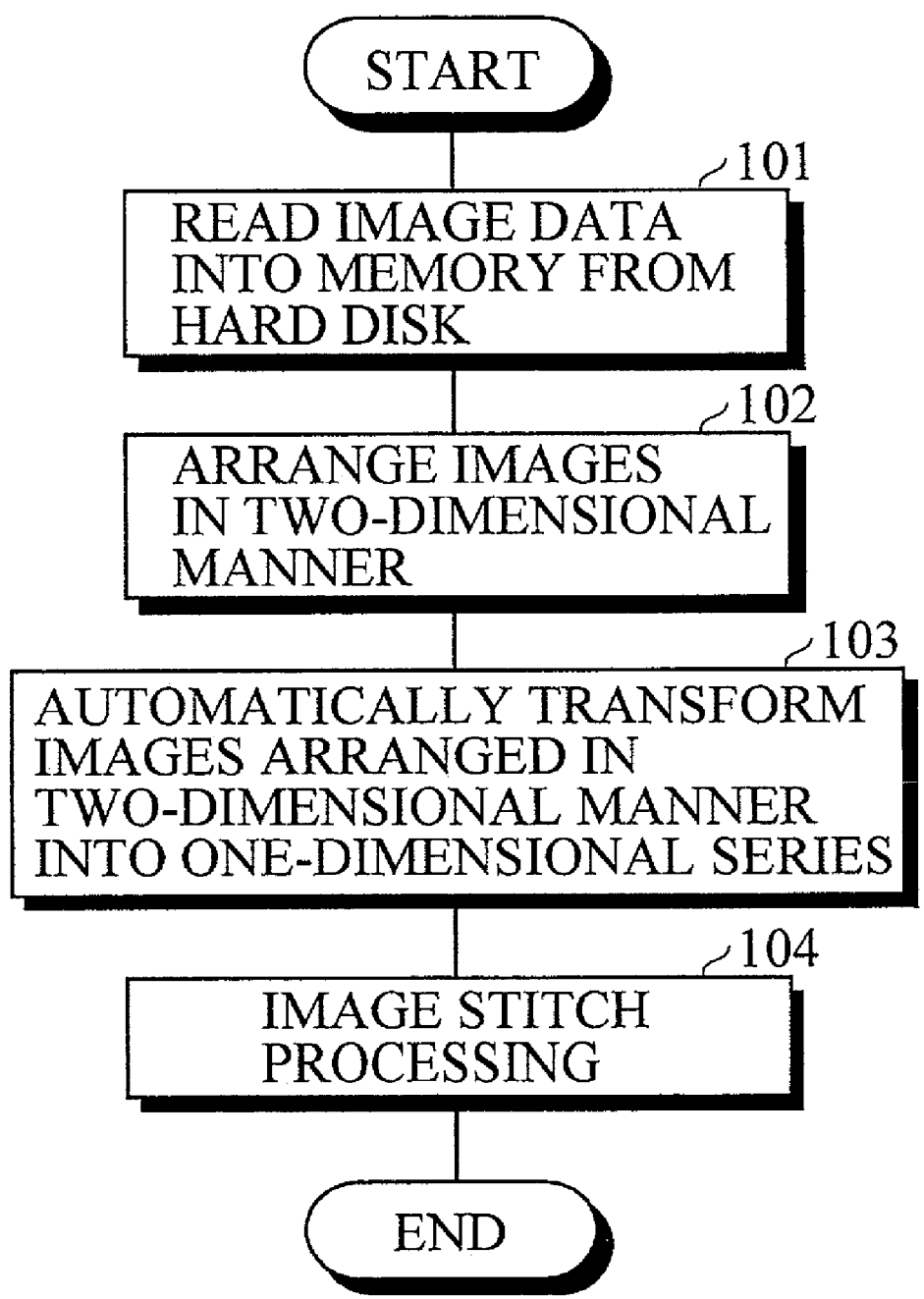
FIG. 25 is a flow chart showing the procedure for overall image stitch processing by a microscopic image stitcher (the procedure for image stitch processing in a second embodiment)

FIG. 25 shows the procedure for processing of an image stitcher.

Figure 26:
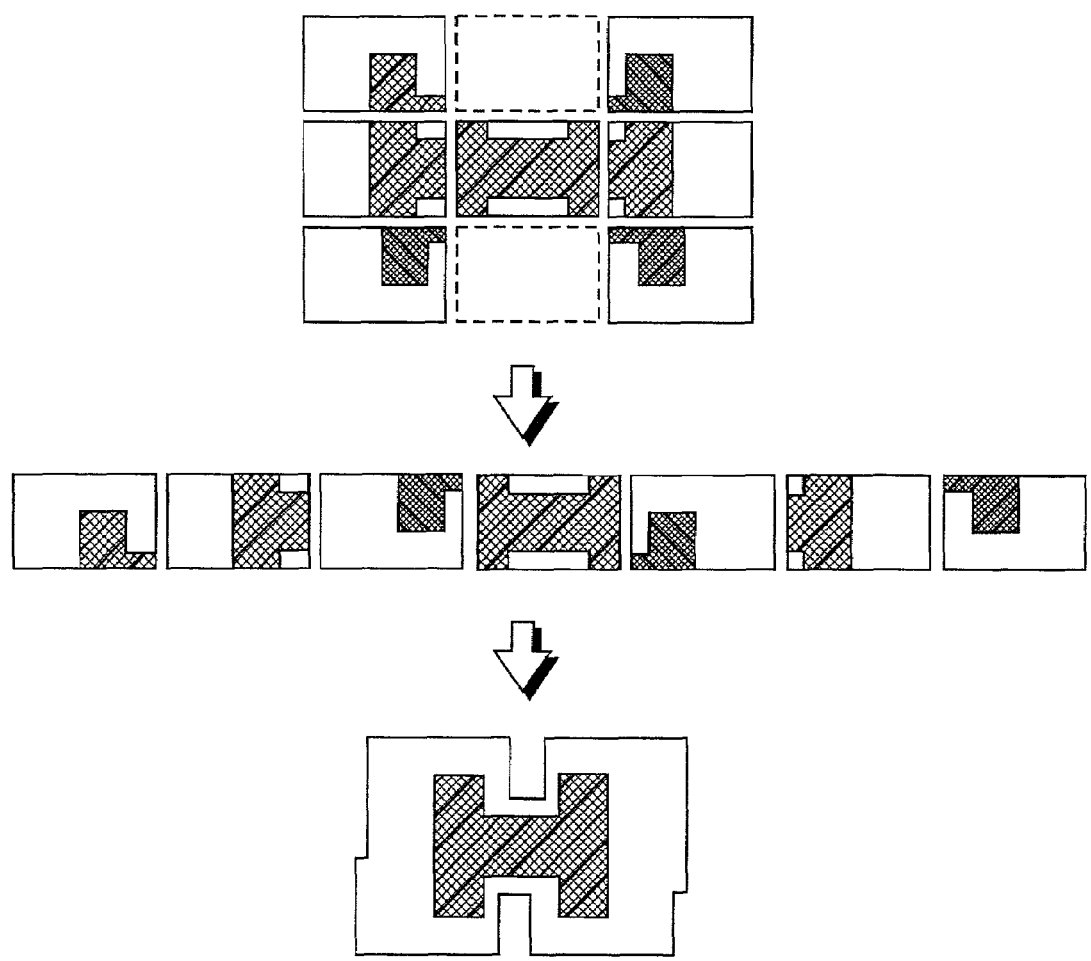
FIG. 26 is a schematic view for explaining an image stitching method.

First, image data is first read in the memory from the hard disk 13 (step 101). Images are then arranged in a two-dimensional manner on the basis of information related to the two-dimensional arrangements in the hard disk 13 (step 102). The images arranged in a two-dimensional manner are displayed on a monitor 21. A drawing in the upper stage of FIG. 26 illustrates the images arranged in a two-dimensional manner. In this example, images are missing at positions on the upper and lower sides of the central position in a two-dimensional arrangement of three rows and three columns.

The images arranged in a two-dimensional manner are then automatically transformed into a one-dimensional series such that the adjacent images are overlapped with each other (step 103). That is, the images arranged in a two-dimensional manner are automatically arranged in a one-dimensional manner such that the adjacent images are overlapped with each other. The images arranged in a one-dimensional manner are displayed on the monitor 21. A drawing in the middle stage of FIG. 26 illustrates the images arranged in a one-dimensional manner.

Thereafter, in the images arranged in a one-dimensional manner, all the images are stitched by stitching the adjacent images (step 104). The result of the image stitching is displayed on the monitor 21. A drawing in the lower stage of FIG. 26 illustrates the result of the image stitching.

Figure 27:
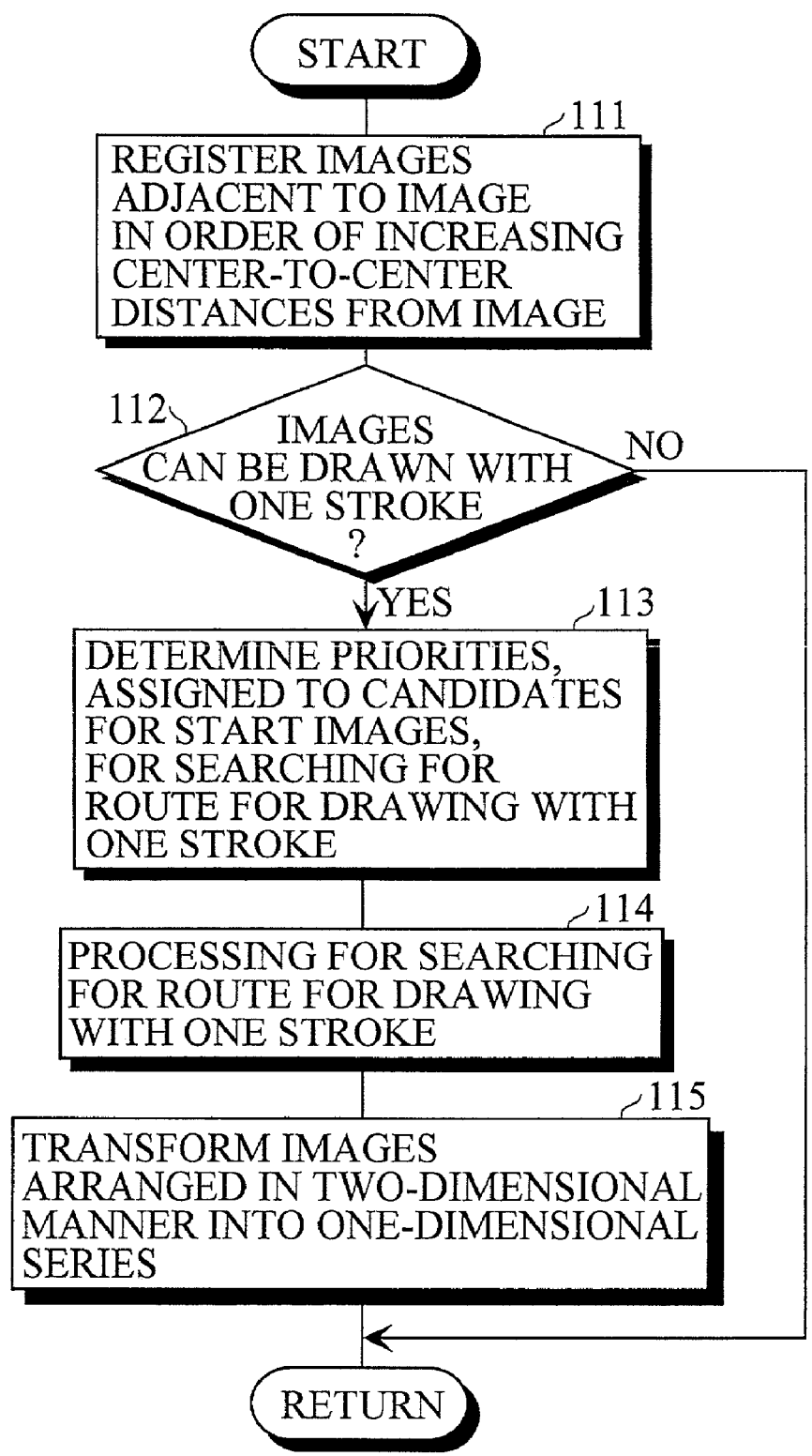
FIG. 27 is a flow chart showing the detailed procedure for processing in the step 103 shown in FIG. 25.

FIG. 27 shows the detailed procedure for the processing in the foregoing step 103 (the processing for automatically transforming the images arranged in a two-dimensional manner into a one-dimensional series).

For each of the images arranged in a two-dimensional manner, the images adjacent thereto (adjacent images) are registered in the order of increasing center-to-center distances from the image (in the order of descending search priorities) (step 111) When there exist a plurality of images adjacent to a certain image, they are handled, considering that the shorter the center-to-center distance from the image is, the higher the search priority is in processing for searching for a route for drawing with one stroke considering the center-to-center distance between images, described later. In the step 111, therefore, for each of the images arranged in a two-dimensional manner, images adjacent thereto (adjacent images) are registered in the order of descending search priorities. The images adjacent to the certain image are images adjacent to the certain image in an upward and downward direction, a rightward and leftward direction, and an oblique direction. It is assumed that there is an overlapped portion between the adjacent images.

Figure 28:
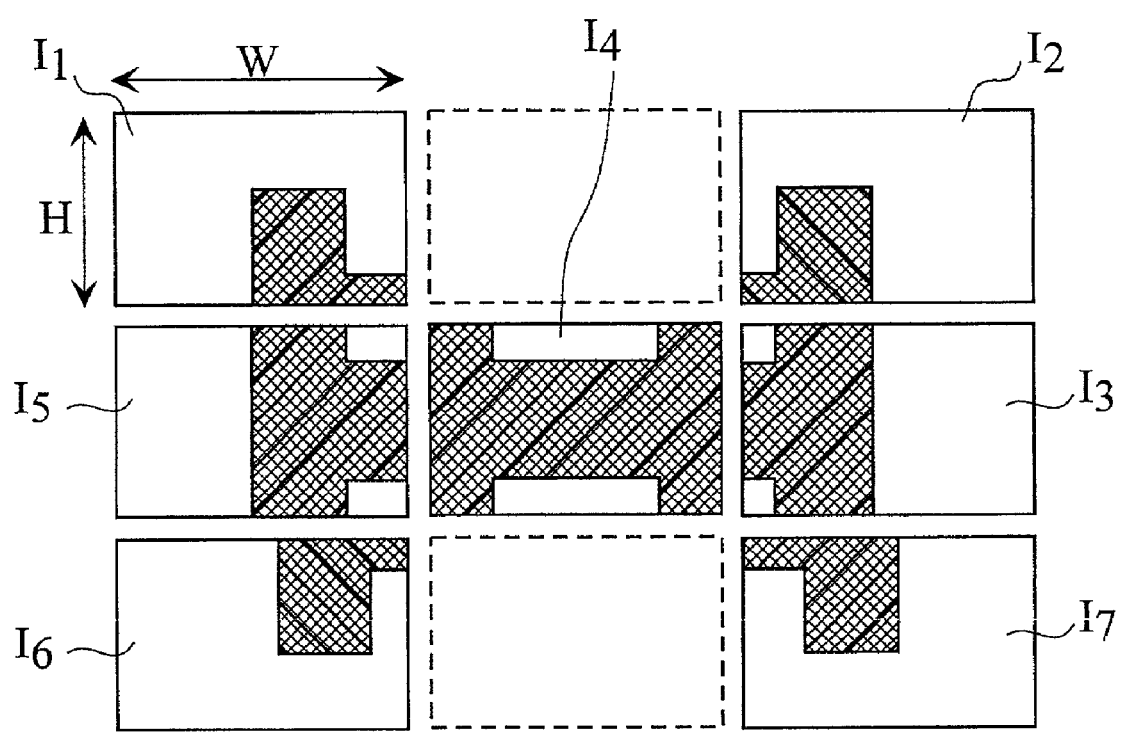
FIG. 28 is a schematic view for explaining processing in the step 111 shown in FIG. 27.

Consider a case where the images arranged in a two-dimensional manner are seven images $I_1$ to $I_7$, as shown in FIG. 28. For each of the images $I_1$ to $I_7$, images adjacent thereto are registered in the order of increasing center-to-center distances from the image. Out of the images adjacent to the image in an upward and downward direction, a rightward and leftward direction, and an oblique direction, the center-to-center distance H between the image and the adjacent image arranged in the upward and downward direction is the shortest, the center-to-center distance between the image and the adjacent image arranged in the oblique direction is the longest, and the center-to-center distance W between the image and the adjacent image arranged in the rightward and leftward direction is a length intermediate therebetween.

Consequently, with respect to the image $I_3$, for example, the three adjacent images $I_2$, $I_7$, and $I_4$ are registered in this order, as shown in FIG. 28. With respect to the image $I_6$, the two adjacent images $I_5$ and $I_4$ are registered in this order.

Figure 29:
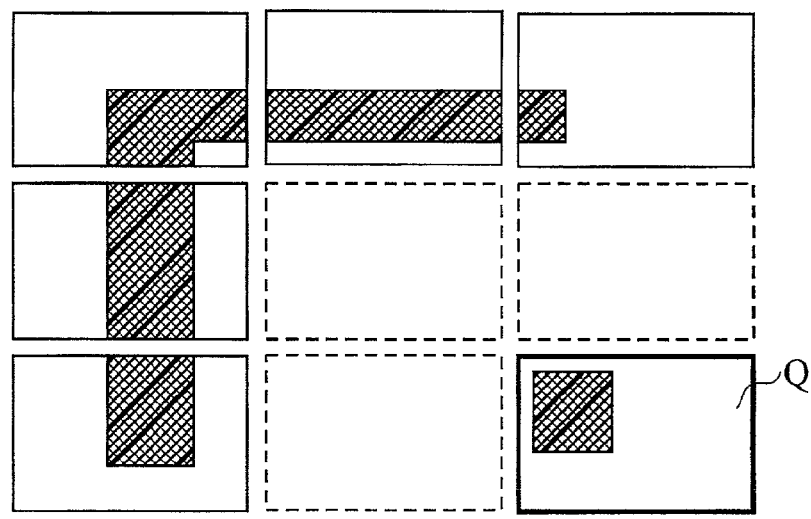
FIG. 29 is a schematic view for explaining processing in the step 112 shown in FIG. 27
Figure 30:
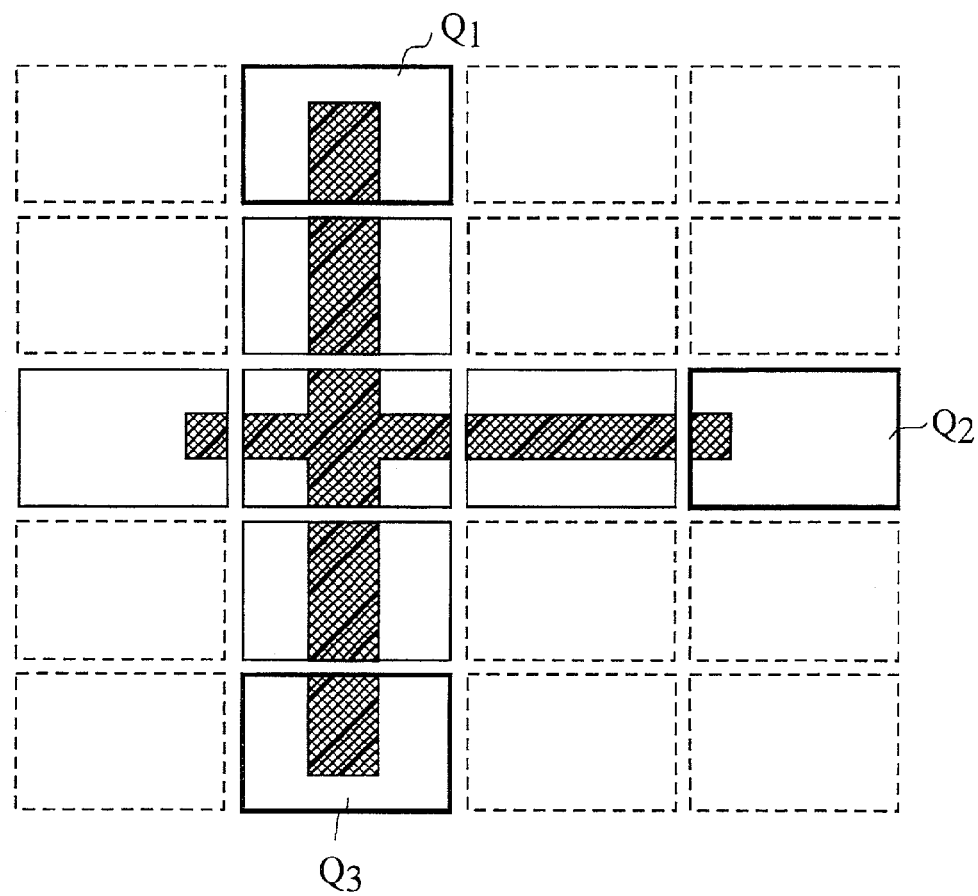
FIG. 30 is a schematic view for explaining processing in the step 112 shown in FIG. 27

It is then judged whether or not the images arranged in a two-dimensional manner can be drawn with one stroke (step 112). That is, it is judged that a route for drawing with one stroke cannot be obtained in a case where there exists an image Q to which no images are adjacent, as shown in FIG. 29, or a case where there exist three or more images Q1, Q2, and Q3 to which only one image is adjacent, as shown in FIG. 30, while it is judged that a route for drawing with one stroke can be obtained in the other cases.

When it is impossible to obtain the route for drawing with one stroke, image stitching cannot be performed, thereby terminating the processing. When it is possible to obtain the route for drawing with one stroke, priorities, assigned to candidates for start images, for searching for the route for drawing with one stroke cannot be determined (step 113).

Figure 31:
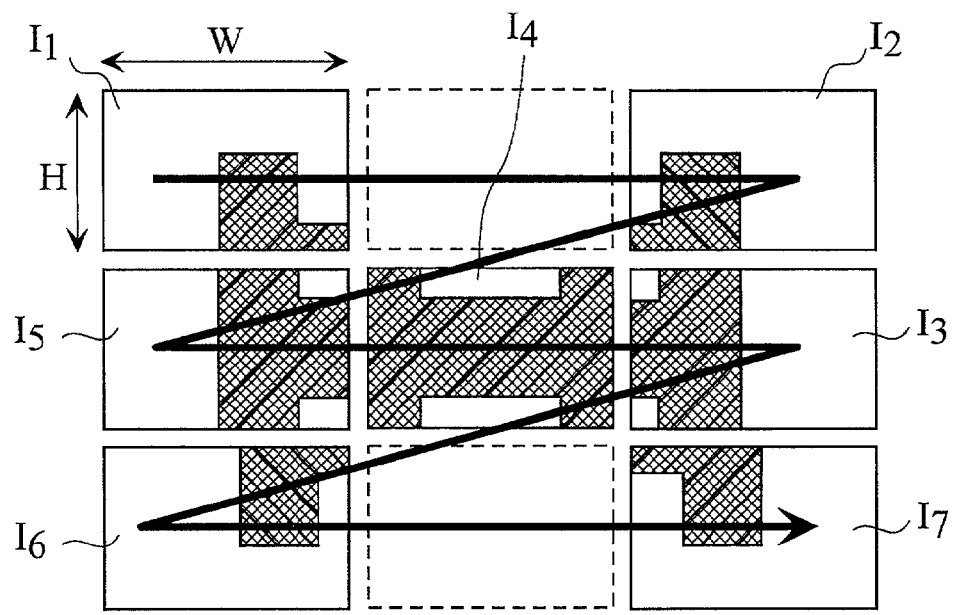
FIG. 31 is a schematic view for explaining processing in the step 112 shown in FIG. 27

That is, the images arranged in a two-dimensional manner are scanned in a particular direction (e.g., in a raster-scan direction as shown in FIG. 31), thereby determining priorities, assigned to candidates for start images, for searching for a route for drawing with one stroke.

When the images arranged in a two-dimensional manner are raster-scanned, as shown in FIG. 31, priorities assigned to candidates for start images are $1_1$, $1_2$, $1_5$, $1_4$, $1_3$, $1_6$, and $1_7$.

Figure 32:
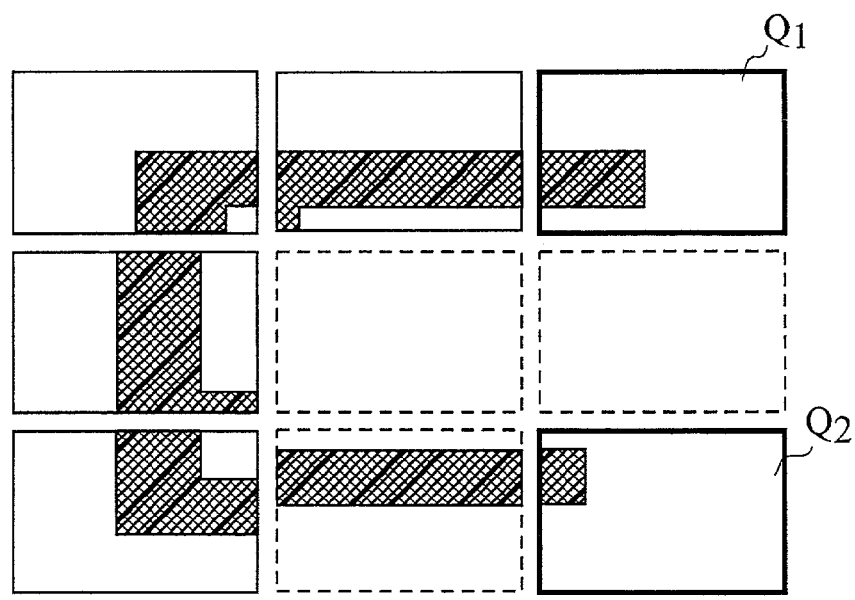
FIG. 32 is a schematic view for explaining processing in the step 113 shown in FIG. 27.

When there exist two images Q1 and Q2 to which only one image is adjacent, as shown in FIG. 32, either one of the images is determined as the first-highest priority start image, and the other image is determined as the second-highest priority start image.

Processing for searching for a route for drawing with one stroke is then performed (step 114). The details of the processing will be described later. When the route for drawing with one stroke is searched for, the images arranged in a two-dimensional manner are arranged in a one-dimensional manner on the basis of the result of the search (step 115). That is, the images arranged in a two-dimensional manner are transformed into a one-dimensional series.

Figure 33:
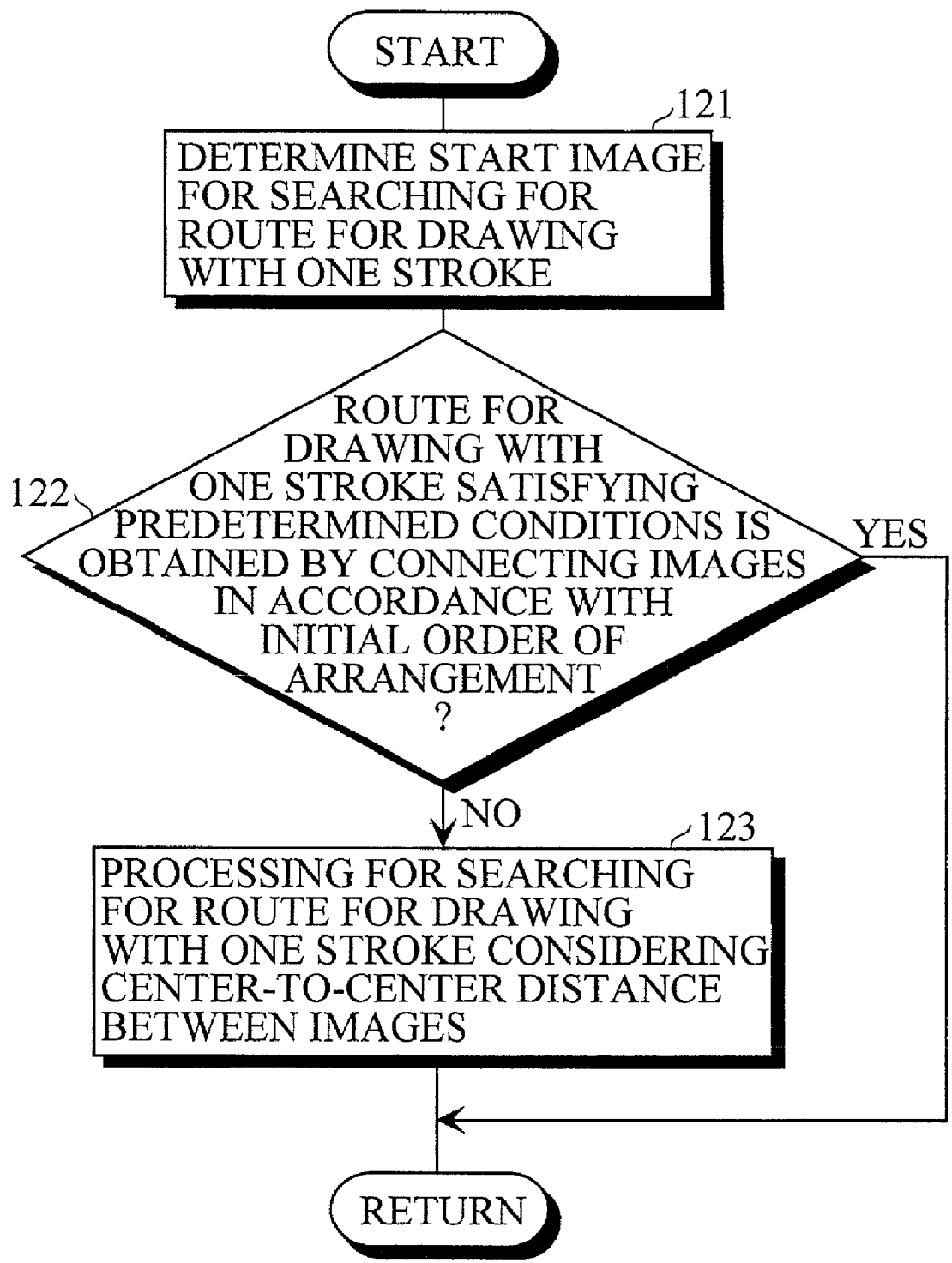
FIG. 33 is a flow chart showing the detailed procedure for processing in the step 114 shown in FIG. 27.

FIG. 33 shows the procedure for processing for searching for a route for drawing with one stroke.

On the basis of the priorities, assigned to the candidates for start images, determined in the foregoing step 113, the start image for searching for the route for drawing with one stroke is first determined (step 121).

Images are then connected to one another in accordance with the initial order in which the images are arranged, that is, the order in which the images are picked up by a camera, thereby judging whether or not a route which satisfies conditions under which the adjacent images on the images arranged in a two-dimensional manner are connected to each other and along which all the images can be drawn with one stroke (a route for drawing with one stroke satisfying predetermined conditions) is obtained (step 122). When the route for drawing with one stroke satisfying the predetermined conditions is obtained, the current processing is terminated.

On the other hand, when the route for drawing with one stroke satisfying the predetermined conditions is not obtained, the processing for searching for the route for drawing with one stroke considering the center-to-center distance between images is performed (step 123). That is, processing for searching for a route which satisfies conditions under which the adjacent images on the images arranged in a two-dimensional manner are connected to each other and along which all the images can be drawn with one stroke is performed.

When the seven images $I_1$, $I_2$, ... $I_6$, $I_7$ shown in FIG. 28 are picked up in this order, for example, the images are selected in accordance with the order in the foregoing step 122. Since $I_2$ is not adjacent to $I_1$, however, a route for drawing with one stroke satisfying predetermined conditions cannot be determined even if the images are connected to one another in accordance with the initial order in which the images are arranged. In this case, the program proceeds to the step 123.

Figure 34:
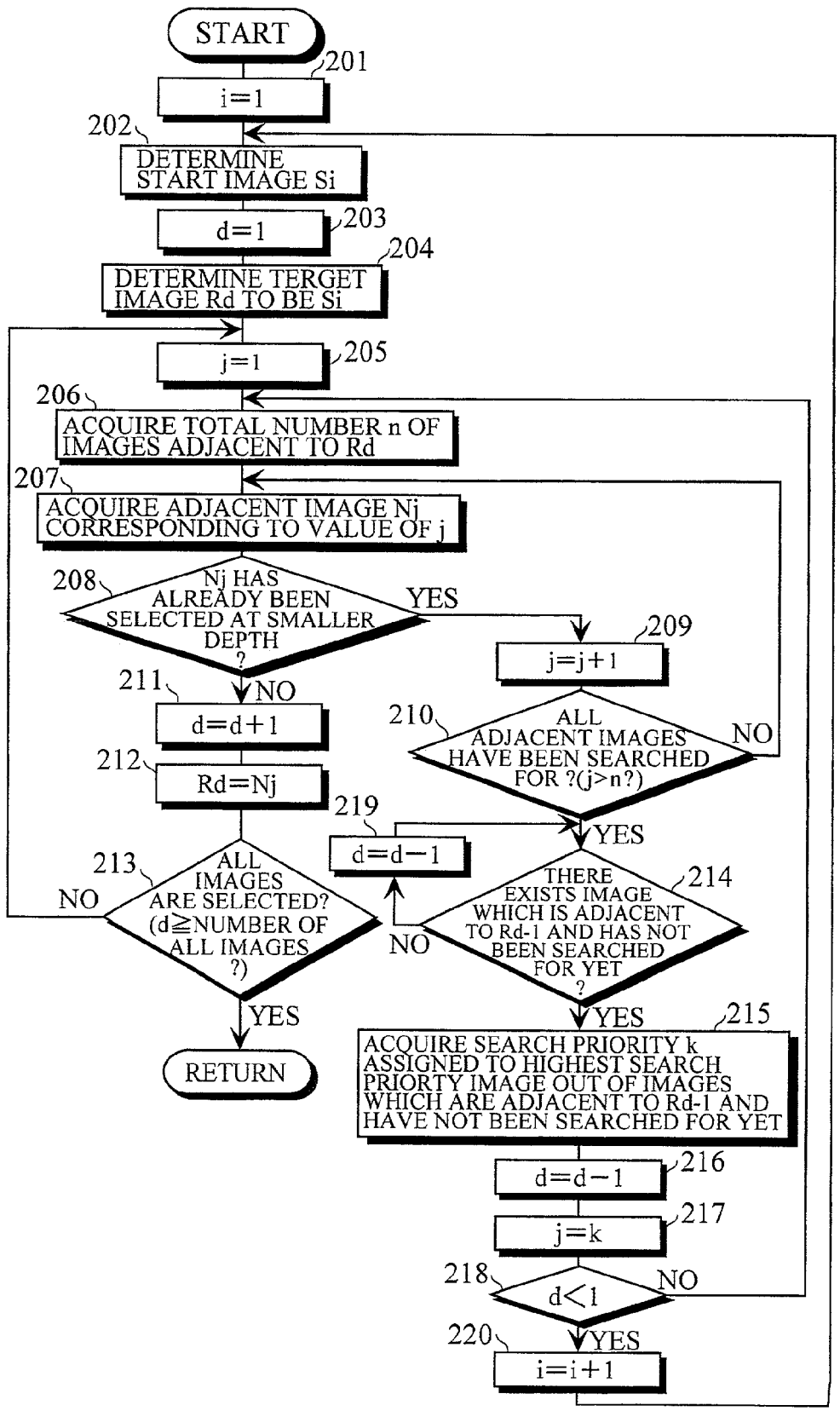
FIG. 34 is a flow chart showing the detailed procedure for processing in the step 123 shown in FIG. 33.

FIG. 34 shows the procedure for the processing for searching for a route for drawing with one stroke considering the center-to-center distance between images.

First, a variable i indicating search priorities assigned to start images is set to one (step 201). A start image $S_i$ is determined on the basis of the variable i (step 202). Letting a variable d be a variable indicating a search depth, the variable d is set to one (step 203). Letting an image selected at the depth d currently set be a target image $R_d$, a target image $R_i$ selected at the depth (d=1) currently set is determined to be $S_i$ (step 204).

A variable j indicating search priorities assigned to adjacent images is then set to one (step 205). The total number n of images adjacent to the target image $R_d$ is acquired on the basis of the information registered in the step 111 shown in FIG. 27 (step 206).

The adjacent image $N_j$ corresponding to the value of the variable j out of the images adjacent to the target image $R_d$ is acquired on the basis of the information registered in the step 111 shown in FIG. 27 (step 207). It is judged whether or not the adjacent image $N_j$ has already been selected at a smaller depth (step 208).

When it is judged that the adjacent image $N_j$ has already been selected at the smaller depth, the variable j is incremented by one (step 209). It is judged whether or not all the images adjacent to the target image $R_d$ are searched for (step 210). That is, it is judged whether or not j>n. When all the images adjacent to the target image $R_d$ are not searched for (j≦n), the program is returned to the step 207.

When it is not judged in the foregoing step 208 that the adjacent image $N_j$ has already been selected at the smaller depth, the depth d is incremented by one (step 211). Further, $N_j$ is set as the target image $R_d$ selected at the depth d (step 212). It is judged whether or not all the images are selected (step 213). The judgment is made by judging whether or not d≧the number of all images. When all the images are not selected (d<the number of all images), the program is returned to the step 205.

When it is judged in the foregoing step 210 that all the images adjacent to the target image $R_d$ are searched for, that is, when all the images adjacent to the target image $R_d$ have already been selected at the smaller depth, processing for making the search again at a depth smaller than the depth d of the target image $T_d$ is performed.

That is, it is judged whether or not there exist images which are adjacent to an image $R_{d-1}$ selected at a depth (d−1) which is one smaller than the depth d of the target image $R_d$ and have not been searched for yet (images which have not been searched for yet as an image to be selected subsequently to the image $R_{d-1}$) (step 214). When there exist images which are adjacent to the image $R_{d-1}$ and have not been searched for yet, a search priority k assigned to the highest search priority image out of the images which are adjacent to the image $R_{d-1}$ and have not been searched for yet is acquired (step 215). The depth d is decremented by one (step 216). The variable j indicating search priorities assigned to adjacent images is set to k (step 217). Thereafter, it is judged whether or not the depth d is less than one (step 218). When the depth d is not less than one, the program is returned to the step 206.

When it is judged in the foregoing step 214 that there are no images which are adjacent to the image $R_{d-1}$ and have not been searched for yet, the depth d is decremented by one (step 219). Thereafter, the program is returned to the step 214.

When it is judged in the foregoing step 218 that the depth d is less than one, the priority i assigned to a start image is incremented by one in order to change the start image (step 220). Thereafter, the program is returned to the step 202.

When it is judged in the foregoing step 213 that d≧the number of all images, a route for drawing with one stroke which satisfies predetermined conditions with respect to all the images is searched for. Therefore, the current processing is terminated.

Processing for searching for a route for drawing with one stroke considering the center-to-center distance between images shown in FIG. 34 will be described by taking the images shown in FIG. 28 as an example.

(1) Premise

Herein, it is assumed that the image $I_1$ is selected as a start image $S_i$ in the step 202. The image $I_1$ is set as a target image $R_1$ to be selected at a depth d=1 in the step 204.

(2) Processing for Selecting Image $R_2$ at Depth d=2

In the steps 205 to 207, the higher search priority image $I_5$ out of the images $I_4$ and $I_5$ adjacent to the target image $R_1$ (=$I_1$) is acquired. In the step 208 to 212, the depth d is set to two, and the image $I_5$ is set as an image $R_2$ to be selected at a depth d=2. The program is returned to the step 205 through the step 213.

(3) Processing for Selecting Image $R_3$ at Depth d=3

In the steps 205 to 207, the highest search priority image $I_1$ out of the images $I_1$, $I_4$ and $I_6$ adjacent to the target image $R_2$ (=$I_5$) is acquired. However, the image $I_1$ has already been selected at a smaller depth. Therefore, the program is returned to the step 207 from the steps 208, 209, and 210. In the step 207, the image $I_6$ is acquired.

In the step 208 to 212, the depth d is set to three, and the image $I_6$ is set as an image $R_3$ to be selected at a depth d=3. The program is returned to the step 205 through the step 213.

(4) Processing for Selecting Image $R_4$ at Depth d=4

In the steps 205 to 207, the higher search priority image $I_5$ out of the images $I_4$ and $I_5$ adjacent to the target image $R_3$ (=$I_6$) is acquired. However, the image $I_5$ has already been selected at a smaller depth d. Therefore, the program is returned to the step 207 from the steps 208, 209, and 210. In the step 207, the image $I_4$ is acquired.

In the step 208 to 212, the depth d is set to four, and the image $I_4$ is set as an image $R_4$ selected at a depth d=4. The program is returned to the step 205 through the step 213.

(5) Processing for Selecting Image $R_5$ at Depth d=5

In the steps 205 to 207, the highest search priority image $I_3$ out of the images $I_1$, $I_2$, $I_3$, $I_5$, $I_6$ and $I_7$ adjacent to the target image $R_4$ (=$I_4$) is acquired. In the steps 208 to 212, the depth d is set to five, and an image $I_3$ is set as the image $R_5$ selected at a depth d=5. The program is returned to the step 205 through the step 213.

(6) Processing for Selecting Image $R_6$ at Depth d=6

In the steps 205 to 207, the highest search priority image $I_2$ out of the images $I_2$, $I_4$, and $I_7$ adjacent to the target image $R_5$ (=$I_3$) is acquired. In the steps 208 to 212, the depth d is set to six, and the image $I_2$ is set as an image $R_6$ to be selected at a depth d=6. The program is returned to the step 205 through the step 213.

(7) Processing for Selecting Image $R_7$ at Depth d=7

In the steps 205 to 207, the higher search priority image $I_3$ out of the images $I_3$ and $I_4$ adjacent to the target image $R_6$ (=$I_2$) is acquired. However, the image $I_3$ has already been selected at the smaller depth. Therefore, the program is returned to the step 207 from the steps 208, 209, and 210. In the step 207, the image $I_4$ is acquired. Since the image $I_4$ has also already been selected at a smaller depth, however, the program proceeds to the step 214 from the steps 208, 209, and 210.

It is judged in the step 214 whether or not there exists an image which is adjacent to $R_5$ (=$I_3$) and has not been searched for yet. In this example, there exists an image $I_7$ which is adjacent to $R_5$ (=$I_3$) and has not been searched for yet. Therefore, the program proceeds to the step 215. In the step 215, a search priority k=2 assigned to the image $I_7$ is acquired. The depth d is changed to 5 from the current value 6 in the step 216, and the search priority j is set to k=2 in the step 217.

The program proceeds to the step 206 through the step 218. In the step 206, the number n of images adjacent to the image $R_5$ (=$I_3$) selected at the depth d=5 is acquired. In the step 207, an adjacent image $N_j$ (=$I_7$) is acquired. In the steps 208 to 212, the depth d is set to six, and the image $I_7$ is set as an image $R_6$ to be selected at the depth d=6. The program is returned to the step 205 through the step 213.

(8) Processing for Selecting Image $R_7$ at Depth d=7 (Second Time)

In the steps 205 to 207, the higher search priority image $I_3$ out of the images $I_3$ and $I_4$ adjacent to the target image $R_6$ (=$I_7$) is acquired. However, the image $I_3$ has already been selected at the smaller depth. Therefore, the program is returned to the step 207 from the steps 208, 209, and 210. In the step 207, the image $I_4$ is acquired. Since the image $I_4$ has also already been selected at the smaller depth, however, the program proceeds to the step 214 from the steps 208, 209, and 210.

It is judged in the step 214 whether or not there exists an image which is adjacent to $R_5$ (=$I_3$) and has not been searched for yet. In this example, there exists no image which is adjacent to $R_5$ (=$I_3$) and has not been searched for yet. Therefore, the program proceeds to the step 219. In the step 219, the depth d is changed to 5 from the current value 6. Thereafter, the program is returned to the step 214.

It is judged in the step 214 whether or not there exists an image which is adjacent to $R_4$ (=$I_4$) and has not been searched for yet. In this example, there exist images $I_2$ and $I_7$ which are adjacent to $R_4$ (=$I_4$) and have not been searched for yet. Therefore, the program proceeds to the step 215. In the step 215, a search priority k=4 assigned to the image $I_2$ is acquired. The depth d is changed to 4 from the current value 5 in the step 216, and a search priority j is set to k=4 in the step 217.

The program proceeds to the step 206 through the step 218. In the step 206, the number n of images adjacent to the image $R_4$ (=$I_4$) selected at the depth d=4 is acquired. In the step 207, an adjacent image $N_j$ (=$I_2$) is acquired. In the steps 208 to 212, the depth d is set to five, and the image $I_2$ is set as an image $R_5$ to be selected at the depth d=5. The program is returned to the step 205 through the step 213.

(9) Processing for Selecting Image $R_6$ at Depth d=6 (Second Time)

In the steps 205 to 207, the higher priority image $I_3$ out of the images $I_3$ and $I_4$ adjacent to the target image $R_5$ (=$I_2$) is acquired. In the steps 208 to 212, the depth d is set to six, and the image $I_3$ is set as an image $R_6$ to be selected at the depth d=6. The program is returned to the step 205 through the step 213.

(10) Processing for Selecting Image $R_7$ at Depth d=7 (Third Time)

In the steps 205 to 207, the highest priority image $I_2$ out of the images $I_2$, $I_4$ and $I_7$ adjacent to the target image $R_6$ (=$I_3$) is acquired. However, the image $I_2$ has already been selected for at the smaller depth. Therefore, the program is returned to the step 207 from the steps 208, 209, and 210. In the step 207, the image $I_4$ is acquired.

In the steps 208 to 212, the depth d is set to seven, and the image $I_7$ is set as an image $R_7$ to be selected at the depth d=7. The answer is in the affirmative in the step 213. Therefore, the current processing is terminated.

Figure 35:
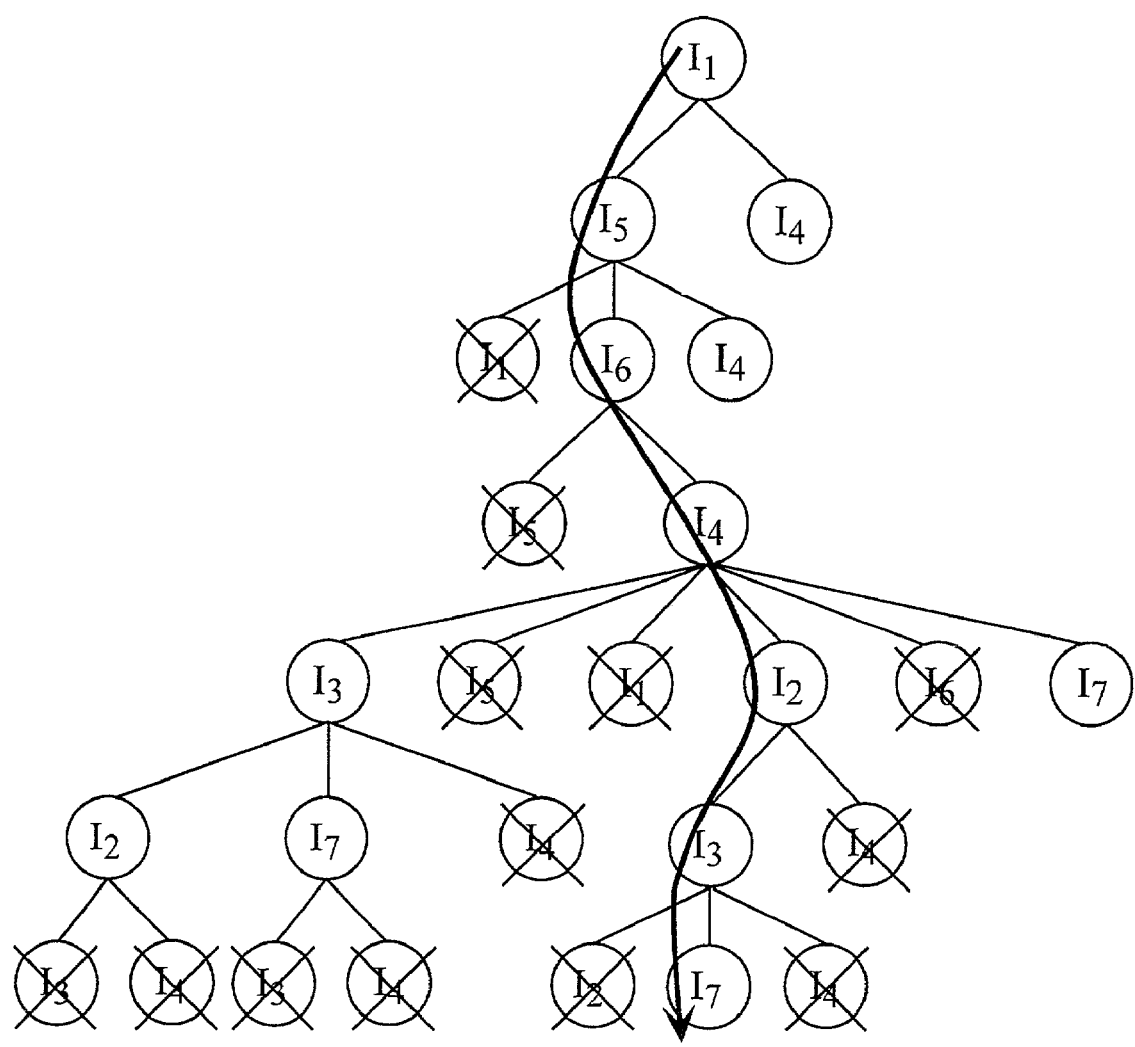
FIG. 35 is a schematic view showing the result of processing for searching for a route for drawing with one stroke considering the center-to-center distance between images in a case where the original image is shown in FIG. 28.

FIG. 35 illustrates the result of the processing for searching for a route for drawing with one stroke considering the center-to-center distance between images in a case where the original image is shown in FIG. 28. As shown in FIG. 35, a route for drawing the images $I_1$, $I_5$, $I_6$, $I_4$, $I_2$, $I_3$, and $I_7$ with one stroke is set. As indicated in the middle stage of FIG. 26, the seven images are arranged in a one-dimensional manner in accordance with the route for drawing with one stroke.

The adjacent images out of the images arranged in a one-dimensional manner are stitched in this order. As a result, the images are stitched, as indicated in the lower stage of FIG. 26. Specifically, an overlapped portion extracted for the adjacent images is utilized, to establish a correspondence between feature points for the adjacent images. The feature points between which a correspondence is established for the adjacent images are utilized, thereby calculating a geometric transform factor for the adjacent images and stitching all the images utilizing the geometric transform factor calculated for the adjacent images.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image stitcher for arranging a plurality of images to be stitched in m rows and n columns (m and n are natural numbers) on a monitor screen and stitching the plurality of images, the image stitcher comprising:

means for setting the number of rows m and the number of columns n to arrange the plurality of images to be stitched in m rows and n columns on the monitor screen, wherein m and n each have a value greater than 1;

means for displaying on the monitor screen an image arrangement pattern selection screen including a plurality of image arrangement patterns each indicating how to arrange the plurality of images in the m rows and n columns;

means for causing a user to select one of the plurality of image arrangement patterns on the image arrangement pattern selection screen;

means for arranging the plurality of images to be stitched in the m rows and n columns on the monitor screen in accordance with the image arrangement pattern selected by the user;

means for causing the user to select one of image stitching modes for stitching the plurality of images arranged in the m rows and n columns on the monitor screen, wherein a first mode, a second mode and a third mode are previously prepared as the image stitching modes;

means for automatically performing, when the first mode is selected, all of a first process for determining pairs of adjacent images between which an overlapped portion is to be extracted based on arrangement positions of the plurality of images, a second process for extracting the overlapped portion in each pair of adjacent images determined in the first process and for registering the two images of each pair based on the overlapped portion extracted in the pair, a third process for detecting corresponding points between the two images of each pair based on all the images registered in the second process, and a fourth process for finding geometric transform matrices for stitching all the images, from the corresponding points detected for each pair of adjacent images in the third process, and for stitching all the images using the geometric transform matrices;

means for automatically performing the first process, the third process and the fourth process from among said first to fourth processes when the second mode is selected, and causing the user to manually register the overlapped portion between the two images of each pair instead of performing the second process; and means for automatically performing the first process and the fourth process from among said first to fourth processes when the third mode is selected, and causing the user to manually specify the corresponding points between the two images of each pair instead of performing the second and third processes.

2. The image stitcher according to claim 1, further comprising:

means for saving the currently selected image arrangement pattern as an initial value when a new image arrangement pattern is selected.

3. An image stitching method for arranging a plurality of images to be stitched in m rows and n columns (m and n are natural numbers) on a monitor screen and stitching the plurality of images, the method comprising the steps of:

setting the number of rows m and the number columns n to arrange the plurality of images to be stitched in m rows and n columns on the monitor screen, wherein m and n each have a value greater than 1;

displaying on the monitor screen an image arrangement pattern selection screen including a plurality of image arrangement patterns each indicating how to arrange the plurality of images in the m rows and n columns;

causing a user to select one of the plurality of image arrangement patterns on the image arrangement pattern selection screen;

arranging the plurality of images to be stitched in m rows and n columns on the monitor screen in accordance with the image arrangement pattern selected by the user;

causing the user to select one of image stitching modes for stitching the plurality of images arranged in the m rows and n columns on the monitor screen, wherein a first mode, a second mode and a third mode are previously prepared as the image stitching modes;

automatically performing, when the first mode is selected, all of a first process for determining pairs of adjacent images between which an overlapped portion is to be extracted based on arrangement positions of the plurality of images, a second process for extracting the overlapped portion in each pair of adjacent images determined in the first process and for registering the two images of each pair based on the overlapped portion extracted in the pair, a third process for detecting corresponding points between the two images of each pair based on all the images registered in the second process, and a fourth process for finding geometric transform matrices for stitching all the images, from the corresponding points detected for each pair of adjacent images in the third process, and for stitching all the images using the geometric transform matrices;

automatically performing the first process, the third process and the fourth process from among said first to fourth processes when the second mode is selected, and causing the user to manually register the overlapped portion between the two images of each pair instead of performing the second process; and automatically performing the first process and the fourth process from among said first to fourth processes when the third mode is selected, and causing the user to manually specify the corresponding points between the two images of each pair instead of performing the second and third processes.

4. The image stitching method according to claim 3, further comprising the step of:

saving the currently selected image arrangement pattern as an initial value when a new image arrangement pattern is selected.

5. A computer readable medium encoded with an image stitch processing program, for arranging a plurality of images to be stitched in m rows and n columns (m and n are natural numbers) on a monitor screen and stitching the plurality of images, wherein the program causes a computer to carry out the steps of:

setting the number of rows m and the columns n to arrange the plurality of images to be stitched in m rows and n columns on the monitor screen, wherein m and n each have a value greater than 1;

displaying on the monitor screen an image arrangement pattern selection screen including a plurality of image arrangement patterns each indicating how to arrange the plurality of images in the m rows and n columns;

causing a user to select one of the plurality of image arrangement patterns on the image arrangement pattern selection screen; and arranging the plurality of images to be stitched in m rows and n columns on the monitor screen in accordance with the image arrangement pattern selected by the user;

causing the user to select one of image stitching modes for stitching the plurality of images arranged in the m rows and n columns on the monitor screen, wherein a first mode, a second mode and a third mode are previously prepared as the image stitching modes;

automatically performing, when the first mode is selected, all of a first process for determining pairs of adjacent images between which an overlapped portion is to be extracted based on arrangement positions of the plurality of images, a second process for extracting the overlapped portion in each pair of adjacent images determined in the first process and for registering the two images of each pair based on the overlapped portion extracted in the pair, a third process for detecting corresponding points between the two images of each pair based on all the images registered in the second process, and a fourth process for finding geometric transform matrices for stitching all the images, from the corresponding points detected for each pair of adjacent images in the third process, and for stitching all the images using the geometric transform matrices;

automatically performing the first process, the third process and the fourth process from among said first to fourth processes when the second mode is selected, and causing the user to manually register the overlapped portion between the two images of each pair instead of performing the second process; and automatically performing the first process and the fourth process from among said first to fourth processes when the third mode is selected, and causing the user to manually specify the corresponding points between the two images of each pair instead of performing the second and third processes.

6. The computer readable recording medium according to claim 5, wherein the program causes the computer to carry out the step of saving the currently selected image arrangement pattern as an initial value when a new image arrangement pattern is selected.

7. An image stitching method comprising:

a first step of arranging a plurality of images in a two-dimensional manner such that their respective arrangement positions conform to an actual relative positional relationship;

a second step of automatically arranging all the images arranged in a two-dimensional manner in such a one-dimensional manner that the adjacent images have an overlapped portion; and a third step of determining the adjacent images on the basis of the images arranged in a one-dimensional manner and stitching the adjacent images to obtain a composite image of all images in order for the composite image to be displayed on a monitor, the second step comprising the steps of registering for each of the images arranged in a two-dimensional manner information related to the adjacent images having an overlapped portion comprising information for specifying the adjacent images and information related to the distances between the center of the image and the centers of the adjacent images, searching for a route which satisfies conditions under which the adjacent images having an overlapped portion are connected to each other and along which all the images can be drawn with one stroke using the information related to the adjacent images which is registered for each of the images, and arranging, when the route which satisfies conditions under which the adjacent images are connected to each other and along with all the images can be drawn with one stroke can be searched for, all the images in a one-dimensional manner in accordance with the route searched for.

* * * * *